(12) United States Patent
Zimmer

(10) Patent No.: US 9,487,415 B2
(45) Date of Patent: Nov. 8, 2016

(54) MOBILE MECHANICAL VAPOR RECOMPRESSION EVAPORATOR

(71) Applicant: Artur G. Zimmer, Oxford, MD (US)

(72) Inventor: Artur G. Zimmer, Oxford, MD (US)

(73) Assignee: Caloris Engineering, LLC, Easton, MD (US)

( * ) Notice: Subject to any disclaimer, the term of this patent is extended or adjusted under 35 U.S.C. 154(b) by 862 days.

(21) Appl. No.: 13/840,660

(22) Filed: Mar. 15, 2013

(65) Prior Publication Data

US 2014/0262730 A1    Sep. 18, 2014

(51) Int. Cl.
| | |
|---|---|
| C02F 1/04 | (2006.01) |
| B01D 1/28 | (2006.01) |
| B01D 5/00 | (2006.01) |
| B01D 1/16 | (2006.01) |
| B01D 1/30 | (2006.01) |
| B01D 19/00 | (2006.01) |
| B01D 1/00 | (2006.01) |
| B01D 1/04 | (2006.01) |

(52) U.S. Cl.
CPC ............ *C02F 1/041* (2013.01); *B01D 1/0094* (2013.01); *B01D 1/04* (2013.01); *B01D 1/16* (2013.01); *B01D 1/289* (2013.01); *B01D 1/2896* (2013.01); *B01D 1/305* (2013.01); *B01D 5/006* (2013.01); *B01D 5/0009* (2013.01); *B01D 19/0057* (2013.01); *C02F 1/048* (2013.01); *C02F 2203/008* (2013.01)

(58) Field of Classification Search
CPC ...... C02F 1/041; C02F 1/048; B01D 1/0094; B01D 1/04; B01D 1/28–1/2896; B01D 5/0009; B01D 1/006
See application file for complete search history.

(56) References Cited

U.S. PATENT DOCUMENTS

| | | | |
|---|---|---|---|
| 2,280,093 A | 4/1942 | Kleinschmidt | |
| 2,441,361 A * | 5/1948 | Kirgan | ................ B01D 1/0082 |
| | | | 159/24.3 |

(Continued)

FOREIGN PATENT DOCUMENTS

| | | |
|---|---|---|
| CA | 2630022 A1 | 8/2003 |
| GB | 988337 | 4/1965 |
| JP | 5261202 A | 10/1993 |

OTHER PUBLICATIONS

Power Supplies, Obtained Mar. 11 2016, http://www.eecontrols.com/documents/DetasPowerSupplies.pdf.*

(Continued)

*Primary Examiner* — In Suk Bullock
*Assistant Examiner* — Jonathan Miller
(74) *Attorney, Agent, or Firm* — Finnegan, Henderson, Farabow, Garrett & Dunner LLP

(57) ABSTRACT

A mobile mechanical vapor recompression evaporator system including a horizontal vapor separator and a horizontal forced circulation heat exchanger. The horizontal vapor separator can include a generally cylindrical housing configured in a generally horizontal orientation. The housing can include at least one product chamber having at least one product passage configured to receive at least one product. The housing further includes at least one vapor chamber having at least one vapor passage and at least one vapor window located between the at least one product chamber and the at least one vapor chamber, wherein a portion of the at least one product evaporates in the product chamber to produce a vapor that passes through the at least one vapor window into the at least one vapor chamber, and is discharged through the at least one vapor passage.

19 Claims, 19 Drawing Sheets

(56) References Cited

U.S. PATENT DOCUMENTS

| | | | | |
|---|---|---|---|---|
| 2,978,226 | A | * | 4/1961 | White .................... F28D 7/1646 165/161 |
| 3,532,160 | A | * | 10/1970 | Garrison ............... F28D 7/1646 165/159 |
| 4,070,168 | A | | 1/1978 | Beattie |
| 4,168,211 | A | * | 9/1979 | Pottharst, Jr. ............ B01D 1/10 159/14 |
| 4,382,467 | A | * | 5/1983 | Garrison ............... F28D 7/1638 122/510 |
| 4,539,023 | A | | 9/1985 | Boley |
| 4,561,941 | A | | 12/1985 | Dinnage et al. |
| 4,617,031 | A | | 10/1986 | Suh et al. |
| 5,427,685 | A | | 6/1995 | Thorley |
| 5,645,694 | A | | 7/1997 | Stewart et al. |
| 5,766,412 | A | | 6/1998 | Railey |
| 5,772,850 | A | * | 6/1998 | Morris ..................... B01D 1/12 159/24.2 |
| 5,814,192 | A | * | 9/1998 | Pittmon ................... B01D 1/28 159/28.6 |
| 5,968,321 | A | * | 10/1999 | Sears ..................... B01D 1/221 159/24.1 |
| 6,365,005 | B1 | | 4/2002 | Schleiffarth |
| 6,551,466 | B1 | | 4/2003 | Kresnyak et al. |
| 7,967,955 | B2 | * | 6/2011 | Heins ........................ C02F 1/04 159/47.1 |
| 2005/0051418 | A1 | * | 3/2005 | Lama ...................... B01D 1/10 203/21 |
| 2011/0247500 | A1 | | 10/2011 | Akhras et al. |

OTHER PUBLICATIONS

PCT Notification of Transmittal of the International Search Report and the Written Opinion of the International Searching Authority, or the Declaration issued in International Application No. PCT/US2014/024464, mailed on Dec. 16, 2014.

General Electric (GE) Press Release, GE to Help Natural Gas Producers Treat Shale Gas Frac Water At the Well Site, Published on GE United States Website Sep. 30, 2010.

Water Desalination Report, 2010 EuroMed Special Edition, vol. 46—No. 37, Mobile Evaporator Desalts Frac Flowback, Published Oct. 4, 2010.

PCT Invitation to Pay Additional Fees and, Where Applicable, Protest Fee issued in International Application No. PCT/US2014/024464 dated Jul. 4, 2014, including Partial International Search Report.

\* cited by examiner

MOBILE MECHANICAL VAPOR RECOMPRESSION EVAPORATOR

TECHNICAL FIELD

The present disclosure relates to a mechanical vapor recompression evaporator including a mobile mechanical vapor recompression evaporator for wastewater.

BACKGROUND

Clean water is becoming an increasingly scarce resource while the demand for clean water is continuously growing. As a result, wastewater treatment and water reuse is becoming ever more important due to the diminishing natural clean water resources. Currently, wastewater can be treated utilizing a variety of technologies (i.e., membranes, bioreactors, filters, chemicals, etc.) or a combination of technologies. In the case of residential wastewater treatment (i.e., sewage treatment), most often the wastewater is treated at a municipal wastewater treatment plant or at the residence using a septic system. For industrial applications, the wastewater is most often treated at a local municipal wastewater treatment plant or it can be treated using an onsite wastewater treatment plant.

Onsite wastewater treatment plants have gained in popularity as environmental regulations directed toward contaminate discharge limits have become more stringent. The reason for this trend is onsite wastewater treatment plants can be designed to treat the particular wastewater of that facility, whereas a municipal wastewater treatment facility may not have the technology to properly treat all the wastewater contaminants that are supplied to the facility, particularly contaminants from industrial wastewater. In fact, some municipal wastewater treatment plants will not accept an industrial wastewater stream when they know their treatment technology is not adequate. An additional benefit of onsite wastewater treatment plants is that the effluent from the plant often can be reused acting as an additional water source for the site.

Onsite wastewater treatment facilities do have some drawbacks, for example, they can require substantial upfront capital investment in addition to the ongoing operational and maintenance cost. Despite the substantial upfront capital investment, for some remote locations and particular industries onsite wastewater treatment is the only viable option because the cost of trucking the wastewater to an offsite treatment facility is cost prohibitive. For example, various mining and natural gas exploration/production activities often in remote locations use substantial amounts of water and create equally substantial amounts of wastewater. Hydro-fracturing is one of those mining and natural gas exploration/production activities that uses significant quantities of water and generates significant quantities of wastewater.

In hydro-fracturing, drilling of the well can involve injecting water, along with sand and a mixture of chemicals under high pressure into a bedrock/shale formation via the well. This method is often referred to as fracking or sometimes hydro-fracking, and is intended to increase the size and extend existing bedrock fractures. The process can involve pumping water into fractures at high pressure in order to create long fracture sand pack intersecting with natural fractures in the shale thereby creating a flow channel network to wellbore. Hydro-fracturing releases the gas trapped in the natural fractures or pores of the shale so it can flow up a pipe to the surface for capture and use.

The hydro-fracturing process can use up to several million gallons of water per well. Consequently, the hydro-fracturing process can draw millions of gallons of freshwater for use as source water, depleting the local clean water sources. The hydro-fracturing fluids which are injected into a well can contain chemicals that can be toxic to humans and wildlife. The flowback water, which is the fluid that comes back up after hydro-fracturing, can include the chemicals pumped in plus both non-toxic and toxic substances that may be present in the shale formation.

The potential environmental impact related to hydro-fracturing (i.e., ground water contamination, mishandling of wastewater, risks to air quality, etc.) has caused concern among regulatory agencies and governments. For example, France in 2011 became the first nation to ban hydro-fracturing. Accordingly, there is a need for greener more environmentally friendly drilling wells using the hydro-fracturing process, particularly, the treatment of the wastewater for reuse.

As discussed above, treatment of the wastewater from the well can be accomplished by transporting the wastewater to an offsite municipal wastewater treatment plant via a sewage system or by trucking. However, the location of the wells can be remote, therefore often no sewage system is available for transporting the wastewater and trucking of the wastewater to the treatment facility is feasible, but often not a practical option due to the cost. Furthermore, the municipal wastewater treatment plant may not have the capacity or technology required to properly treat the wastewater contaminants and if the treated water is to be reused onsite it must also be transported back. Consequently, onsite wastewater treatment is often the most advantageous option, particularly for remote well sites. However, as mentioned above a wastewater treatment plant can require a substantial capital investment and typically the wastewater treatment plant will only be needed for a month or two at an individual well site while it is treating the wastewater produced. As a result, making a substantial capital investment in a permanent treatment plant at an individual well site is not practical either. It is accordingly a primary object of the present disclosure to provide and describe a mobile wastewater treatment plant configured to be transported from well site to well site via ground transportation, using roadways, and designed to treat the well wastewater and produce an effluent that can be reused or safely discharged into local water supplies.

In consideration of the aforementioned circumstances, the present disclosure provides and describes a mobile mechanical vapor recompression (MVR) evaporator that can be transported to a well site and is configured to treat the wastewater and provide a reusable effluent. According to an embodiment of the present disclosure, this can achieved by a horizontal dual chamber vapor separator and horizontal forced circulation evaporator. It is understood that the use of a mobile mechanical vapor recompression evaporator system of the present disclosure is not limited to use for hydro-fracking wastewater, but can be used for contaminated well water, surface water, radioactive water, a large variety of wastewater, or the like in a variety of applications and industries, wherever "in situ" processing of these streams is required or preferred.

SUMMARY

One aspect of the present disclosure is directed to a vapor separator. The vapor separator can comprise a generally cylindrical housing configured in a generally horizontal orientation comprising at least one product chamber having at least one product passage configured to receive at least one product. The vapor separator can further comprise at least one vapor chamber having at least one vapor passage, and at least one vapor window located between the at least one product chamber and the at least one vapor chamber, wherein a portion of the at least one product evaporates in the product chamber to produce a vapor that passes through the at least one vapor window into the at least one vapor chamber, and is discharged through the at least one vapor passage.

In another embodiment, the at least one product passage can be configured to enter the housing near the end, at the top portion of the housing, and tangentially to the arc of the housing wall producing a centrifugal force. In another embodiment, the at least one product passage can be trapezoidal shape and configured to distribute the product the width of the at least one product chamber. In another embodiment, the at least one product passage can further comprise an orifice configured to create a backpressure on the at least one product to suppress evaporation of the product upstream of the orifice. In another embodiment, the at least one product chamber and the at least one vapor chamber can be separated by at least one partition and the at least one product chamber and the at least one vapor chamber can be configured to be substantially the same volume.

In another embodiment, the housing can further comprise at least one product sump located in the lower section of the at least one product chamber configured to receive a liquid portion of the at least one product that does not evaporate and form the vapor. In another embodiment, the at least one product sump can further comprise a plurality of vertical wave dampening baffles configured to minimize turbulent sloshing of the at least one product in the at least one product sump. In another embodiment, the at least one vapor window can comprise a 60° vapor window located in the upper portion of the at least one partition on the side opposite the at least one product passage configured so the vapor passes through the at least one vapor window and undergoes a forced 180° turn in the horizontal plane, the centrifugal force created by the 180° turn can cause a portion of water droplets entrained in the vapor to impinge on the housing and get retained in the at least one product chamber.

In another embodiment, the vapor separator can further comprise at least one removable mesh demister pad located in the at least one product chamber configured to capture entrained product liquid droplets by contact with the surface of the demister pad and positioned so the vapor in the at least one product chamber is drawn by a vapor draft through the at least one mesh demister pad. In another embodiment, the at least one vapor passage can comprise an elbow vapor outlet duct configured so the vapor can be forced by the vapor draft through a 180° turn in the vertical plane into the elbow vapor outlet duct and once in the elbow vapor outlet duct the vapor flows vertically downward before turning 90° in the horizontal plane and liquid droplet impinged on the side of the elbow vapor outlet duct can be collected by a liquid scalper.

In another embodiment, the housing can further comprise dished heads configured to be concave towards the interior of the housing. In another embodiment, the housing can be under a partial vacuum. In another embodiment, the partial vacuum can range in absolute pressure between about 2 psia and about 14 psia. In another embodiment, the at least one product can comprise a first product and a second product, and the at least one product chamber can comprise a first product chamber and a second product chamber, wherein the excess first product in the first product chamber can be transferred to the second product chamber and a portion of second product can be bled from second product chamber to maintain a concentration of second product within second product chamber. In another embodiment, the second product in the second product chamber can be at a final concentration and the final concentration can be higher than a concentration of the first product in the first product chamber.

Another aspect of the present disclosure is direct to a forced circulation heat exchanger. The forced circulation heat exchanger can comprise an inner shell forming a generally cylindrical tube in a generally horizontal orientation. The forced circulation heat exchanger can further comprise at least one product pass having a plurality of tubes within the inner shell and a product inlet passage and a product outlet passage configured to circulate at least one product through the plurality of tubes and a vapor space formed between the inner shell and outer walls of the plurality of tubes. In addition, the forced circulation heat exchanger can comprise an outer shell forming a generally cylindrical tube configured to encompass a portion of the inner shell and creating a first bustle and a second bustle, the first bustle comprising at least one vapor inlet duct and a first outlet passage, and the second bustle comprising at least one vapor inlet duct and at least one vapor opening between the second bustle and the vapor space within the inner shell. The force circulation heat exchanger can also comprise a condensate outlet passage, wherein the apparatus is configured so that a vapor flows through the first vapor inlet duct into the first bustle, through the first outlet passage, through the second vapor inlet duct into the second bustle, and through the vapor opening into the vapor space with the inner shell to contact the outer walls of the plurality of tubes and form a condensate.

In another embodiment, the first vapor inlet duct and the second vapor inlet duct each can comprise a trapezoidal opening that expands outward to form a curved duct member that engages the rounded exterior of the outer shell configured to receive the vapor tangentially to the arc of the curved duct member. In another embodiment, the vapor entering the second bustle can be at a higher vapor pressure than the vapor entering the first bustle. In another embodiment, the vapor space and first bustle and second bustle can be under a partial vacuum. In another embodiment, the partial vacuum in the vapor space can range in absolute pressure between about 5.5 psia and about 30 psia.

In another embodiment, the at least one product pass tubes can comprise a first product pass and a second product pass. In another embodiment, the first product pass can be configured to circulate a first product at about 1000 to about 2000 gpm and the second product pass is configured to circulate a second product at about 1000 to about 2000 gpm. In another embodiment, the first vapor inlet duct and second vapor inlet duct can be configured to minimize the pressure drop of the vapor flowing through. In another embodiment, the forced circulation heat exchanger can further comprise a first fan and a second fan in series, wherein the vapor can pass to the first bustle through the first vapor inlet duct from the first fan, through the first outlet passage to the second fan, and through the second vapor inlet duct to the second bustle. In another embodiment, the vapor that flows into the vapor space that contacts the outside walls of the plurality of tubes can transfer heat to the product circulating inside the tubes, which can condense the vapor into the condensate that then can flow by gravity to the lowest points inside the inner shell.

Another aspect of the present disclosure is directed to a mobile mechanical vapor recompression evaporator system (MMVRE). The MMVRE can comprise a vapor separator comprising a generally cylindrical housing configured in a generally horizontal orientation. The housing can comprise at least one product chamber having at least one product passage configured to receive at least one product, at least one vapor chamber having at least one vapor passage. The housing can also comprise at least one vapor window located between the at least one product chamber and the at least one vapor chamber, wherein a portion of the at least one product evaporates in the product chamber to produce a vapor that passes through the at least one vapor window into the at least one vapor chamber, and is discharged through the at least one vapor passage. The MMVRE can further comprise a forced circulation heat exchanger comprising an inner shell forming a generally cylindrical tube in a generally horizontal orientation. The forced circulation heat exchanger can further comprise at least one product pass having a plurality of tubes within the inner shell and a product inlet passage and a product outlet passage configured to circulate at least one product through the plurality of tubes and a vapor space formed between the inner shell and outer walls of the plurality of tubes. In addition, the forced circulation heat exchanger can comprise an outer shell forming a generally cylindrical tube configured to encompass a portion of the inner shell and creating a first bustle and a second bustle, the first bustle comprising at least one vapor inlet duct and a first outlet passage, and the second bustle comprising at least one vapor inlet duct and at least one vapor opening between the second bustle and the vapor space within the inner shell. The forced circulation heat exchanger can also comprise a condensate outlet passage, wherein the apparatus is configured so that a vapor flows through the first vapor inlet duct into the first bustle, through the first outlet passage, through the second vapor inlet duct into the second bustle, and through the vapor opening into the vapor space with the inner shell to contact the outer walls of the plurality of tubes and form a condensate.

In another embodiment, the mobile mechanical vapor recompression evaporator can further comprise a first fan positioned between the vapor passage and the first vapor inlet duct and a second fan positioned between the outlet passage and the second vapor inlet duct, the first fan can be configured to receive the vapor from vapor passage and raise the pressure to an intermediate pressure and discharge the vapor, and the second fan can be configured to raise the pressure of the vapor from the intermediate pressure to a final pressure and discharging the vapor into the second bustle. In another embodiment, the mobile mechanical vapor recompression evaporator system can be mounted on a trailer configured for transportation on public roads and highways.

In another embodiment, the mobile mechanical vapor recompression evaporator can be powered by an electrical power supply operating at about 460 volts to about 480 volts. In another embodiment, the at least one product can be hydro-fracturing wastewater having an initial TDS up to about 150,000 mg/l and the condensate produced has a TDS below about 500 mg/l. In another embodiment, the vapor separator can operate under a partial vacuum having a range in absolute pressure between about 2 psia and about 14 psia.

In another embodiment, the vapor space with the inner shell can operate under a partial vacuum having a range in absolute pressure between about 5 psia and about 30 psia.

In another embodiment, a portion of the concentrate can be bled from the mobile mechanical vapor recompression evaporator system to maintain a final concentration of the product within the mobile evaporator system. In another embodiment, the mobile mechanical vapor recompression evaporator system can be configured so that the heat balance can be positive after establishing steady state operation. In another embodiment, the at least one product can comprise a first product and a second product, and the horizontal vapor separator can comprise a first product chamber and a second product chamber, wherein the second product in the second product chamber can be at a final concentration and the final concentration can be higher than a concentration of the first product in the first product chamber.

Additional objects and advantages of the present disclosure will be set forth in part in the description which follows, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure as claimed.

The accompanying drawings, which are incorporated in and constitute a part of this specification, illustrate several embodiments of the present disclosure and together with the description, serve to explain the principles of the present disclosure.

BRIEF DESCRIPTION OF THE DRAWINGS

Reference will now be made in detail to the present embodiments of the present disclosure, examples of which are illustrated in the accompanying drawings. Wherever possible, the same reference numbers will be used throughout the drawings to refer to the same or like parts.

DETAILED DESCRIPTION

The present disclosure is described herein with reference to illustrative embodiments for a particular application. It is understood that the embodiments described herein are not limited thereto. Those having ordinary skill in the art and access to the teachings provided herein will recognize additional modifications, applications, embodiments, and substitution of equivalents that all fall within the scope of the present disclosure. Accordingly, the present disclosure is not limited by the foregoing or following descriptions.

Figure 1:
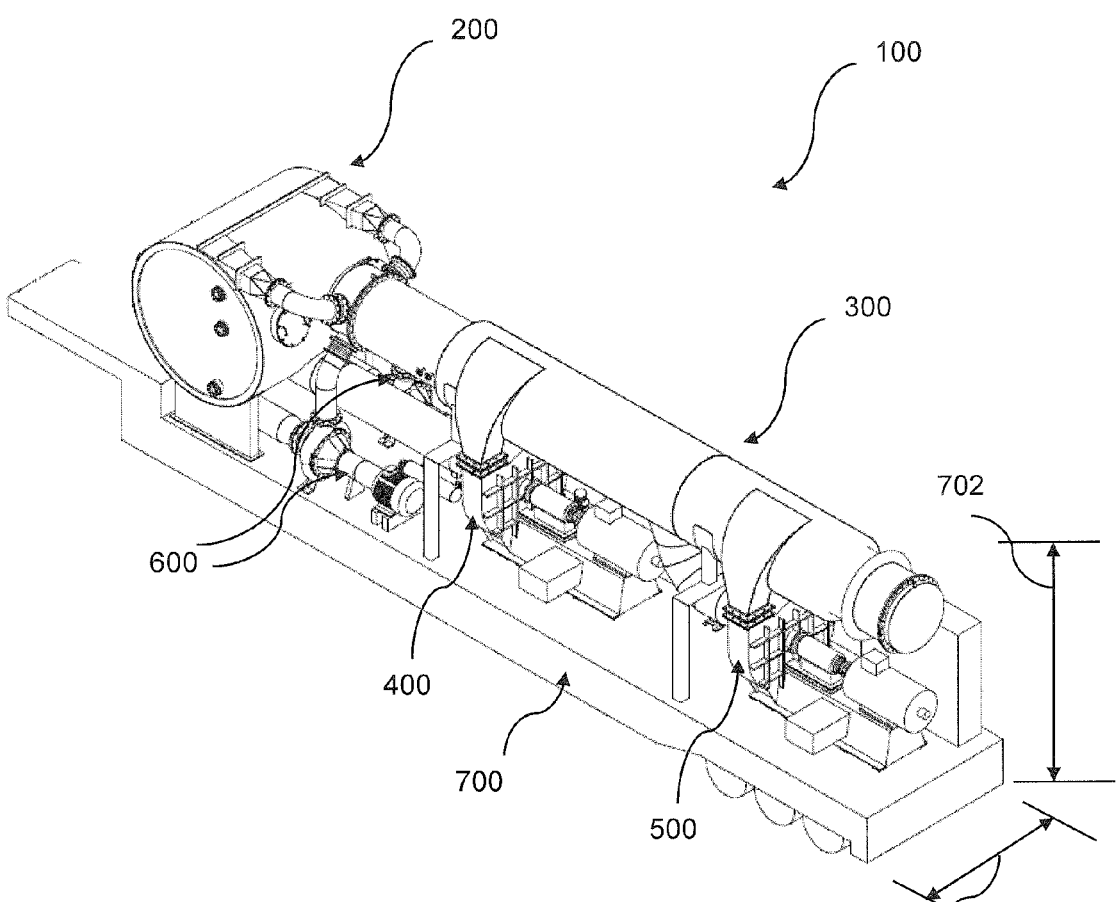
FIG. 1 is a side perspective view of a part of a mobile mechanical vapor recompression evaporator, according to an exemplary embodiment.

FIG. 1 shows a side perspective view of a mobile mechanical vapor recompression evaporator (MMVRE) system 100, according to an exemplary embodiment. Other configurations and arrangements of MMVRE 100 are contemplated.

Figure 2A:
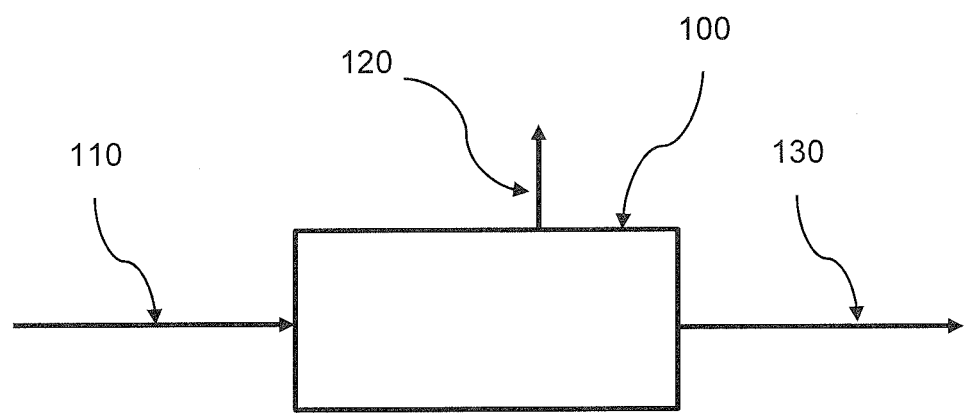
FIG. 2A is a flow schematic of a part of a mobile mechanical vapor recompression evaporator, according to various embodiments.

FIG. 2A shows a flow schematic of MMVRE 100, according to various embodiments. In operation, MMVRE 100 can be configured to receive a product 110 and process the product 110 to produce a concentrate 120 and a condensate 130. The temperature, concentration, and flow rate of product 110, concentrate 120, and condensate 130 can vary based on the application.

For example, according to an exemplary embodiment, product 110 can comprise frac water having a total dissolved solids (TDS) concentration up to about 150,000 mg/l at a temperature range between about 38° F. to about 70° F. Concentrate 120 produced can have a TDS concentration between 200,000 mg/l and 300,000 mg/l at a temperature range between about 60° F. and about 90° F. Condensate 130 produced can have a TDS concentration of less than 500 mg/l, preferably less than 300 mg/l at a temperature range between about 60° F. and about 90° F.

As described above, MMVRE 100, according to an exemplary embodiment, can be used to treat frac water produced during frac drilling operations. In other embodiments, MMVRE 100 can be used to treat contaminated well water, surface water, wastewater, or the like. It is contemplated MMVRE 100 can be used in other applications besides water applications. For example, MMVRE can be used in the processing of cheese whey and whey permeate (dairy processing), caustic solutions (tomato processing), cooling tower and boiler blow down (power manufacturing).

According to various embodiments, in operation, MMVRE 100 can increase the concentration of product 110 and create concentrate 120 while producing condensate 130 by forced recirculation evaporation. In operation, the concentration of product 110 can increase until reaching a final concentration, which can then constitute concentrate 120 and can be discharged from MMVRE 100. As the concentration of product 110 increases in MMVRE 100, the boiling point rises due to boiling-point elevation (BPE). To mitigate the impact of BPE, particularly at or near the final concentration, the evaporation process can be split into two or more product passes.

Figure 2B:
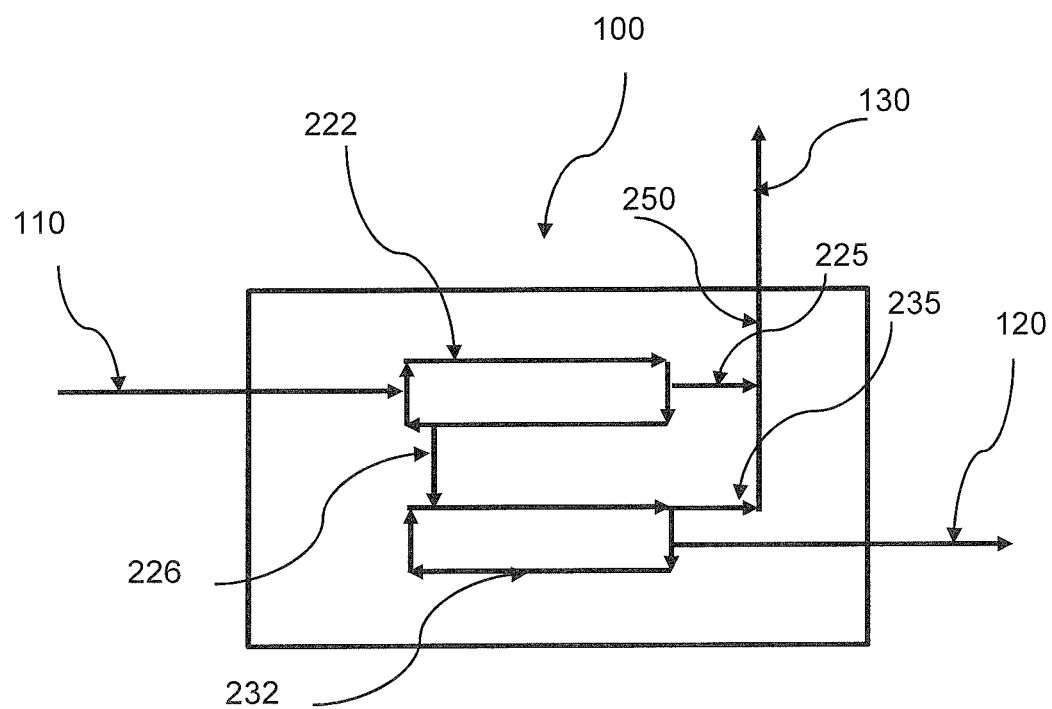
FIG. 2B is a flow schematic of a part of a mobile mechanical vapor recompression evaporator, according to an exemplary embodiment.

For example, MMVRE 100, according to an exemplary embodiment, can be configured to separate product 110 into two product passes with separate evaporation chambers. Splitting the evaporation can increase the capacity and the efficiency of MMVRE 100. As shown in FIG. 2B, MMVRE 100 can have two product passes. Accordingly, product 110 can be separated into a first product 222 and a second product 232 within MMVRE 100. MMVRE 100, according to various embodiments can have one, two, three or more product passes.

Referring back to FIG. 1, MMVRE 100, according to an exemplary embodiment, can comprise a vapor separator 200, a forced circulation heat exchanger 300 (FCHE), a first fan 400, a second fan 500, and a plurality of pumps 600.

MMVRE 100 can further comprise a trailer 700, which can house the other components of MMVRE 100. Trailer 700 can be pulled by a truck, tractor trailer, or the like (not shown) along public roads, thus a width 701 of trailer 700 including the components on trailer 700 can be less than or equal to the maximum width of a wide load trailer allowed by law. For example, width 701 can be less than or equal to 8.5 feet. In addition, a height 702 of trailer 700 including the components on trailer 700 can be less than or equal to the maximum height of a trailer allowed by law. For example, height 702 can be less than or equal to 13.5 feet. In addition, trailer 700, for example, can have an overall length of about 53 feet.

It is contemplated that MMVRE 100 in other embodiments can be configured so a portion of MMVRE 100 disassembles for shipment in order to meet the width and height requirements dictated by US law.

Vapor Separator

Figure 3:
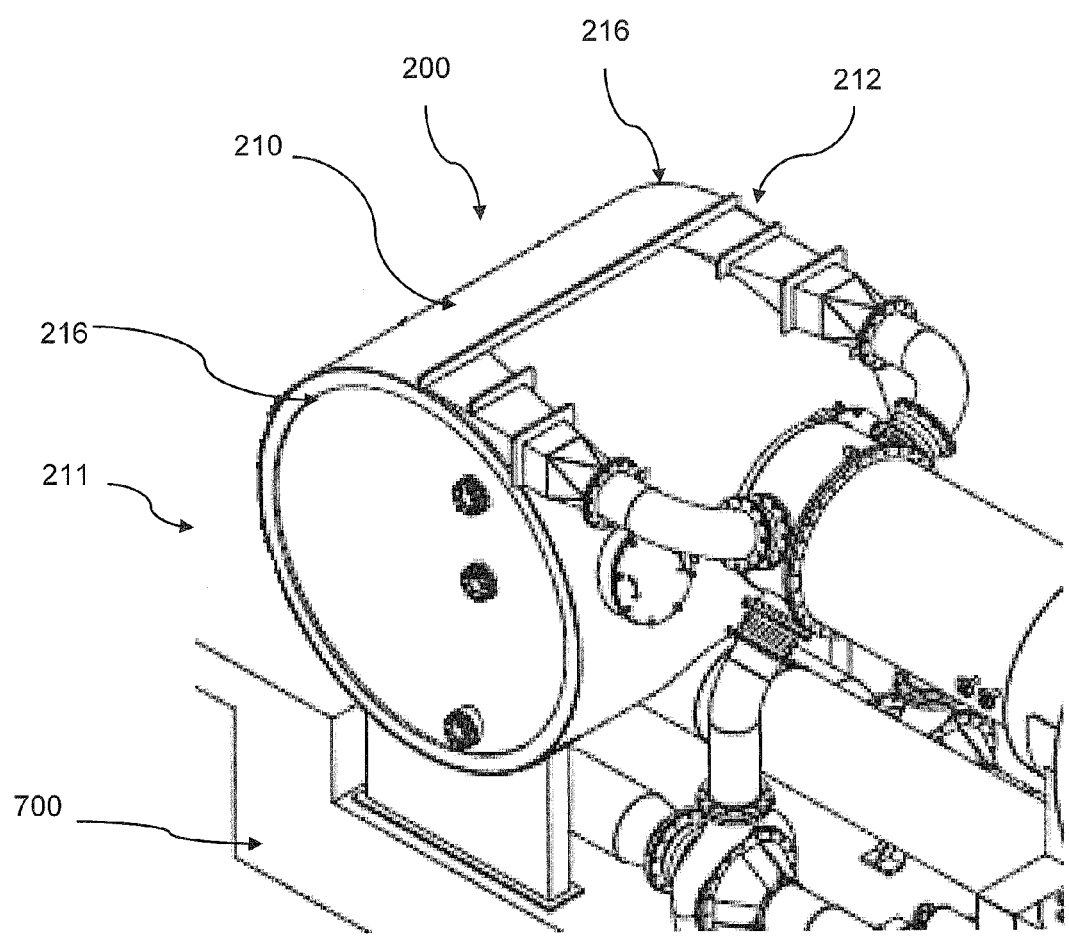
FIG. 3 is an enlarged side perspective view of a part of a mobile mechanical vapor recompression evaporator, showing a vapor separator, according to an exemplary embodiment.
Figure 4A:
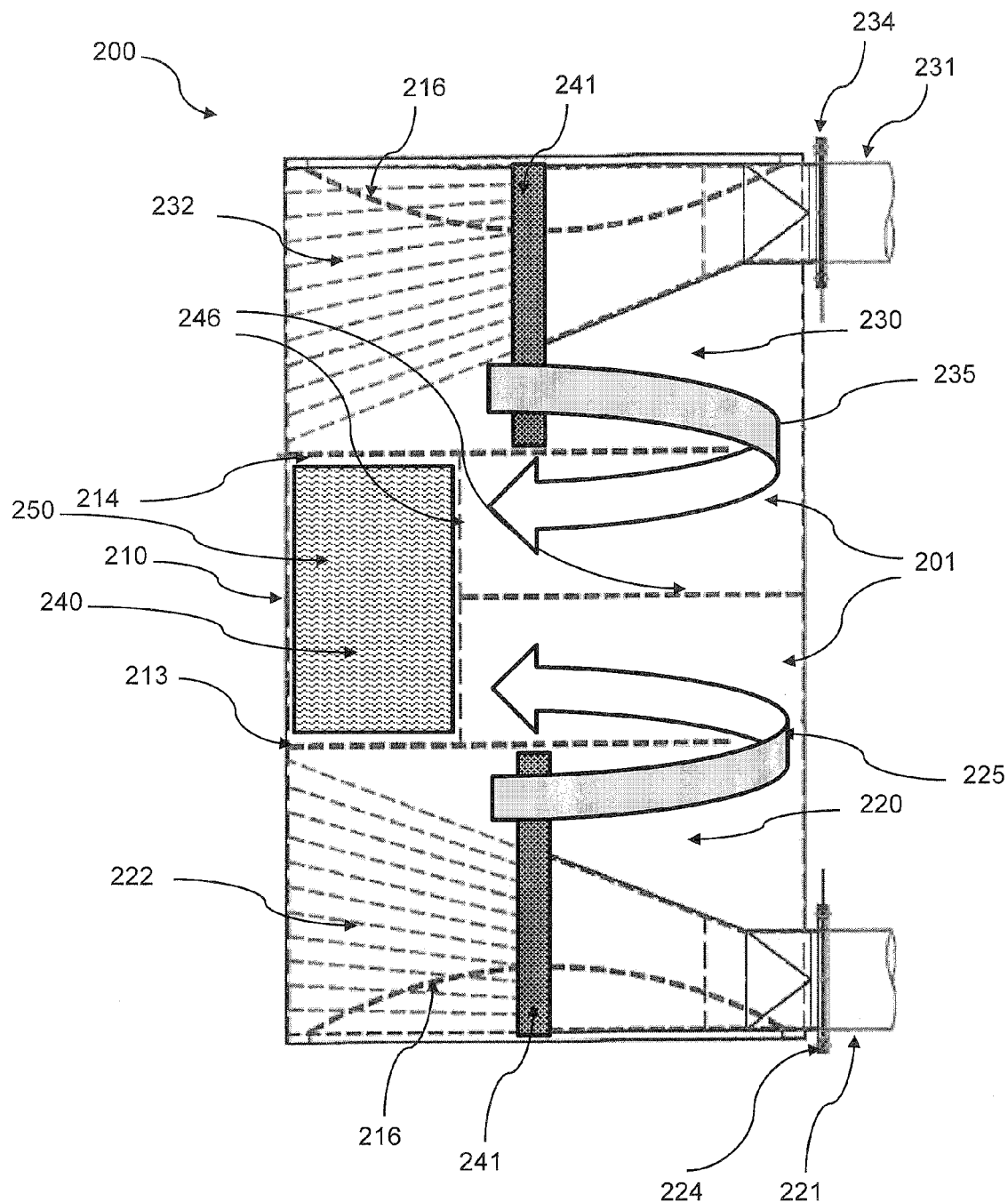
FIG. 4A is a top view of part of a mobile mechanical vapor recompression evaporator, showing a part of the interior of a vapor separator, according to an exemplary embodiment.

FIG. 3 shows vapor separator 200, according to an exemplary embodiment. Vapor separator 200 can comprise a housing 210, generally cylindrical or another suitable shape. Housing 210 can be coupled to trailer 700 in a generally horizontal orientation as shown in FIG. 3. Housing 210 can have a first end 211 and a second end 212. Housing 210 can further comprise a pair of dished heads 216, one located near first end 211 and the other near second end 212. Dished heads 216 can be concave towards the interior of housing 210, as shown in FIG. 4A. Dished heads 216 can increase the structural integrity of housing 210, and can allow vapor separator 200 to operate under a partial vacuum pressure condition within housing 210.

FIG. 4A shows some of the internals of vapor separator 200, according to an exemplary embodiment. Housing 210 can comprise a first vertical partition 213 and a second vertical partition 214 within housing 210. First vertical partition 213 and second vertical partition 214 can be configured to separate housing 210 into a first product chamber 220, a second product chamber 230, and a vapor chamber 240 located between first product chamber 220 and second product chamber 230. Housing 210 can further comprise a product chamber partition 246 configured to separate first product chamber 220 and second product chamber 230, which can eliminate the potential for comingling of first product 222 and second product 232 within vapor separator 200. First product chamber 220, second product chamber 230, and vapor chamber 240 can be configured to be generally equal volume.

Figure 4B:
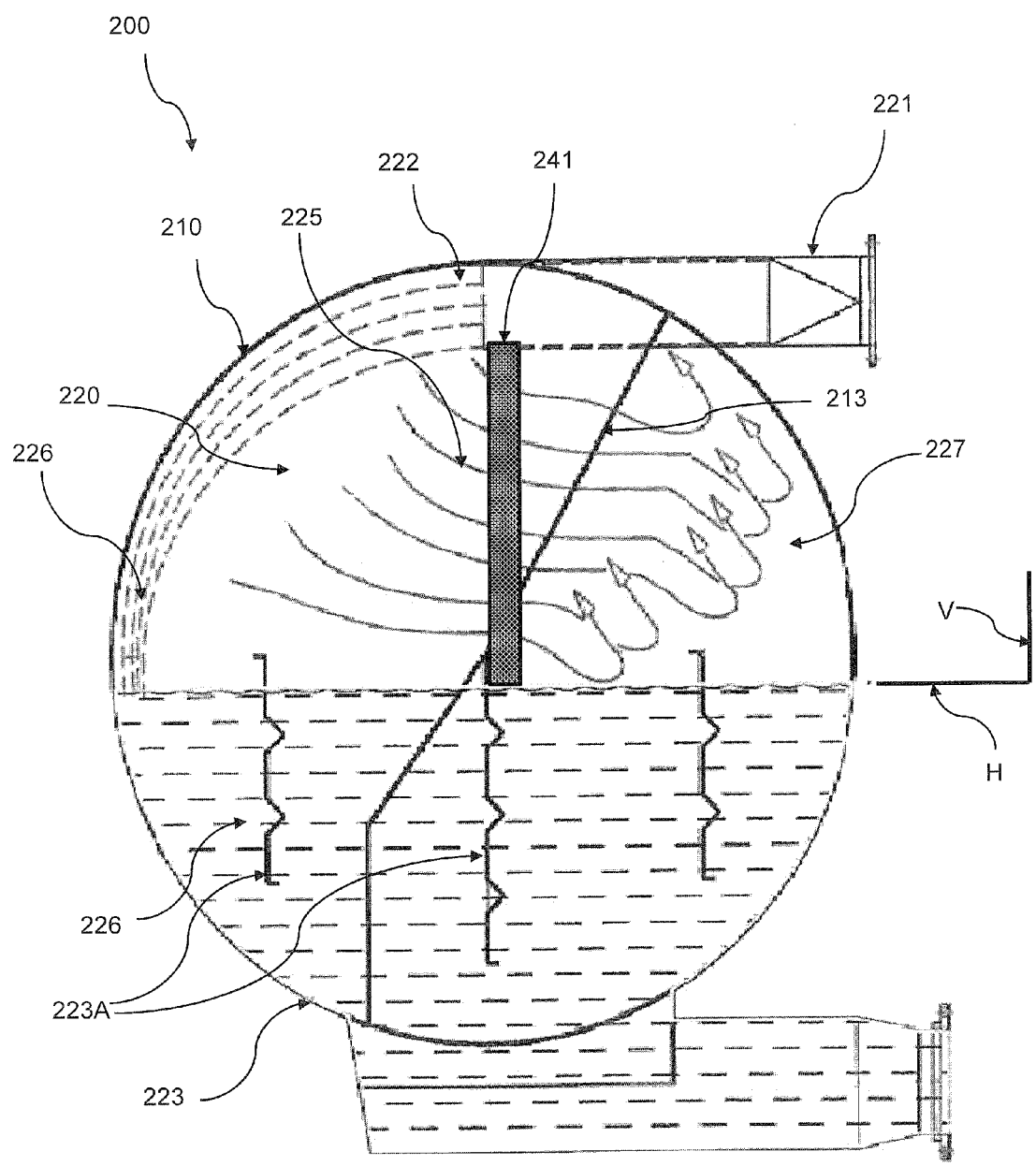
FIG. 4B is a side view of part of a mobile mechanical vapor recompression evaporator, showing a part of the interior of a vapor separator, according to an exemplary embodiment.

First product chamber 220 can have a first product passage 221 configured to receive first product 222. Second product chamber 230 can have a second product passage 231 configured to receive second product 232. First product passage 221 and second product passage 231 can be configured to enter housing 210 at opposite ends and at the top portion of housing 210, as shown in FIG. 3. In addition, first product passage 221 and second product passage 231 can be configured to enter housing 210 tangentially to the arc of the interior wall of housing 210, as shown in FIG. 4B. The geometry of the opening of first product passage 221 and second product passage 231 can be trapezoidal as shown in FIGS. 3 and 4A. In other embodiments, the opening of first product passage 221 and second product passage 231 can be circular, rectangular, or triangular.

First product passage 221 can further comprise a first orifice 224 configured to produce a slight backpressure on first product 222 upstream of first orifice 224. Producing a slight backpressure can suppress evaporation (e.g., flash evaporation) of liquid volatiles prior to first product 222 entering first product chamber 220.

Second product passage 231 can further comprise a second orifice 234 configured to produce a slight backpressure on second product 232 upstream of second orifice 234. Producing a slight backpressure can suppress evaporation (e.g., flash evaporation) of liquid volatiles prior to second product 232 entering second product chamber 230.

As shown in FIG. 4B, first product 222 as it passes through first product passage 221 and into first product chamber 220 can experience a decrease in pressure and a portion (e.g., volatile components) of first product 222 can evaporate (e.g., flash evaporate) producing a first vapor product 225 and the remaining portion of first product 222 can be a first liquid product 226, which can have an increased concentration of dissolved and suspended solids.

Figure 4C:
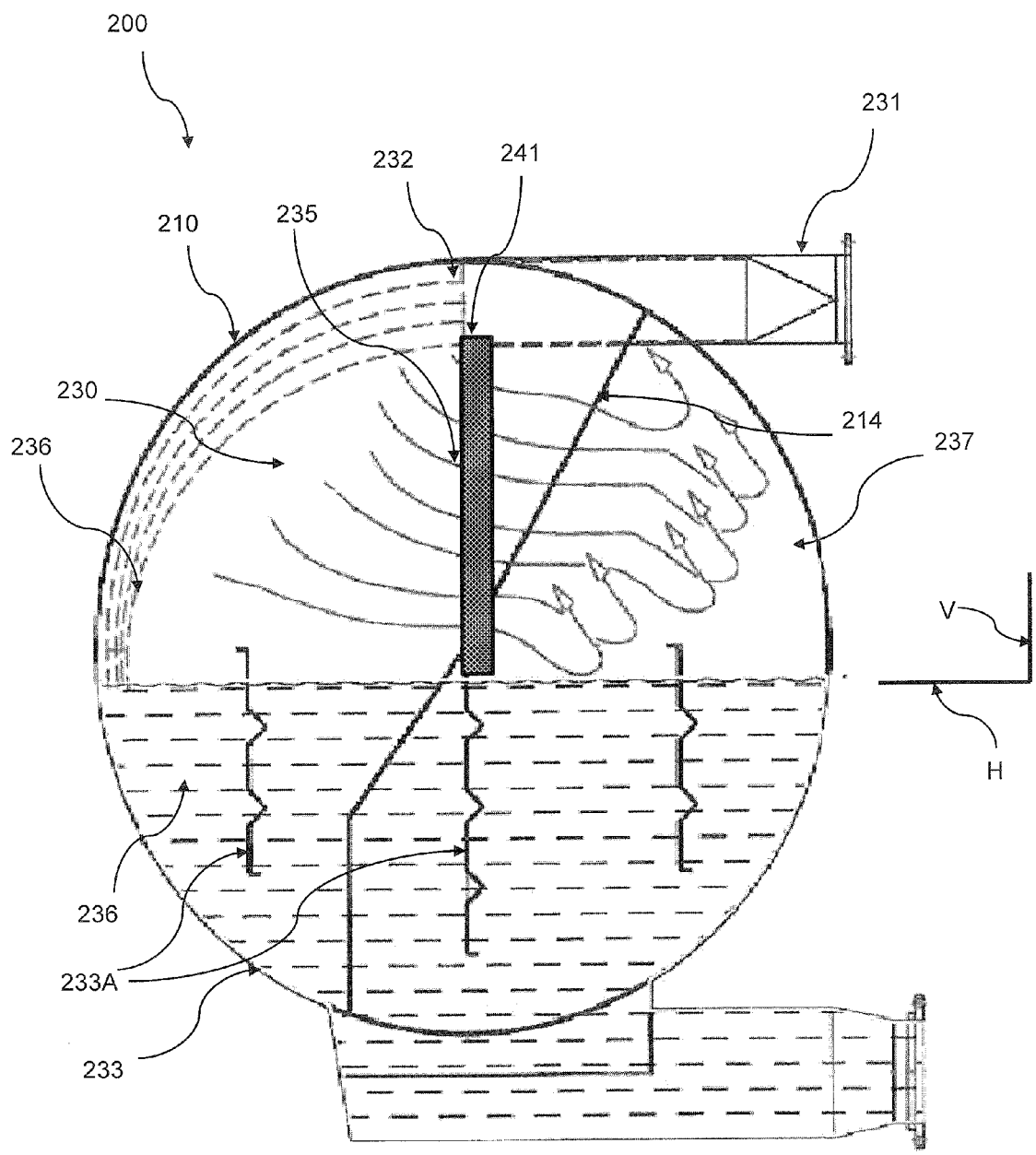
FIG. 4C is a side view of part of a mobile mechanical vapor recompression evaporator, showing a part of the interior of a vapor separator, according to an exemplary embodiment.

As shown in FIG. 4C, second product 232 as it passes through second product passage 231 and into second product chamber 230 can experience a decrease in pressure and a portion (e.g., volatile components) of second product 232 can evaporate (e.g., flash evaporate) producing a second vapor product 235 and the remaining portion of second product 232 can be a second liquid product 236, which can have an increased concentration of dissolved and suspended solids.

Other than the difference in concentration, it is understood that first product 222 and first liquid product 226 can be substantially the same. The use of separate terms, first product 222 and first liquid product 226, is intended for ease of discussion. Similarly, it is understood that second product 232 and second liquid product 236 can be substantially the same besides the difference in concentration. The use of separate terms, second product 232 and second liquid product 236, is intended for ease of discussion.

As shown in FIG. 4B, first product chamber 220 can further comprise a first sump 223 located in the lower portion of first product chamber 220 configured to collect and contain first liquid product 226. As shown in FIG. 4C, second product chamber 230 can further comprise a second sump 233 located in the lower portion of second product chamber 230 configured to collect and contain second liquid product 236. First sump 223 and second sump 233 can comprise a plurality of dampening baffles 223A, 233A. Dampening baffles 223A, 233A can comprise vertical wave dampening baffles configured to minimize the turbulent sloshing of first liquid product 226 and second liquid product 236 within first sump 223 and second sump 233.

As shown in FIG. 4A, first product passage 221 can be configured to distribute first product 222 the width of first product chamber 220 and contact the inside wall of housing 210. For example, first product passage 221 having a trapezoidal geometry can cause first product 222 to spread out entering first product chamber 220. First liquid product 226 remaining after the evaporation (e.g., flash evaporation) of a portion of first product 222 into first vapor product 225 can flow down the inside wall of housing 210 into first sump 223, as shown in FIG. 4B. As first liquid product 226 is progressing down the inside wall of housing 210, volatile components in first liquid product 226 can evaporate (e.g., flash evaporate) producing first vapor product 225.

As shown in FIG. 4A, second product passage 231 can be configured to distribute second product 232 the width of second product chamber 230 and contact the inside wall of housing 210. For example, second product passage 231 having a trapezoidal geometry can cause second product 232 to spread out entering second product chamber 230. Second liquid product 236 remaining after the evaporation (e.g., flash evaporation) of a portion of second product 232 into second vapor product 235 can flow down the inside wall of housing 210 into second sump 233, as shown in FIG. 4C. As second liquid product 236 is progressing down the inside wall of housing 210, volatile components in second liquid product 236 can evaporate (e.g., flash evaporate) producing second vapor product 235.

As shown in FIG. 4B, first product chamber 220 can further comprise a first vapor window 227 cutout of first vertical partition 213. FIG. 4B shows a horizontal plane (H) and a vertical plane (V). First vapor window 227 can be an angled cutout between about 45° and 75°, preferably about 60° cut, in the horizontal plane above the first liquid product 226 level in first sump 223 and in the vertical plane down the centerline of housing 210. First vapor window 227 can be positioned so the opening is towards the side of housing 210 opposite the inside wall upon which first product 222 enters and impinges on the inside wall of housing 210. First vapor window 227 can be configured to allow first vapor product 225 to flow from first product chamber 220 into vapor chamber 240 through first vapor window 227.

As shown in FIG. 4C, second product chamber 230 can further comprise a second vapor window 237 cutout of second vertical partition 214. FIG. 4C shows a horizontal plane (H) and a vertical plane (V). Second vapor window 237 can be an angled cutout between about 45° and 75°, preferably about 60° cut, in the horizontal plane above the second liquid product 236 level in second sump 233 and in the vertical plane down the centerline of housing 210. Second vapor window 237 can be positioned so the opening is towards the side of housing 210 opposite the inside wall upon which second product 232 enters and impinges on the inside wall of housing 210. Second vapor window 237 can be configured to allow second vapor product 235 to flow from second product chamber 230 into vapor chamber 240 through second vapor window 237.

As shown in FIG. 4A, a draft 201 can be created within first product chamber 220, second product chamber 230, and vapor chamber 240 that can facilitate the flow of vapor within vapor separator 200. Within first product chamber 220 and second product chamber 230 first vapor product 225 and second vapor product 235 can be drawn by draft 201 through a pair mesh demister pads 241, one located in each product chamber, as shown in FIGS. 4A, 4B, and 4C. Mesh demister pads 241 can be configured to capture entrained liquid droplets in first vapor product 225 and second vapor product 235 by contact with the surface of mesh demister pad 241. In other embodiments, mesh demister pads 241 can removed and vapor can flow without passing through mesh demister pads 241.

First vapor product 225 can be drawn through first vapor window 227 by draft 201. As first vapor product 225 passes through first vapor window 227 first vapor product 225 can undergo a forced 180° turn in the horizontal plane. A portion of liquid droplets entrained in first vapor product 225 can be directed by the centrifugal force caused by the 180° turn to impinge on the inside wall of first chamber 220 and the liquid droplets can flow down the inside wall into first sump 223.

Second vapor product 235 can be drawn through second vapor window 237 by draft 201. As second vapor product 235 passes through second vapor window 237 second vapor product 235 can undergo a forced 180° turn in the horizontal plane. A portion of liquid droplets entrained in second vapor product 235 can be directed by the centrifugal force caused by the 180° turn to impinge on the inside wall of second chamber 230 and the liquid droplets can flow down the inside wall into second sump 233.

As shown in FIG. 4A, first vapor product 225 after making the forced 180° turn through first vapor window 227 can progress in the horizontal plane across the diameter of vapor chamber 240 towards the opposite wall of housing 210. Second vapor product 235 after making the forced 180° turn through second vapor window 237 can progress in the horizontal plane across the diameter of vapor chamber 240 towards the opposite wall of housing 210. Within vapor chamber 240 first vapor product 225 and second vapor product 235 can co-mingle and can combine into a vapor product 250.

Figure 5:
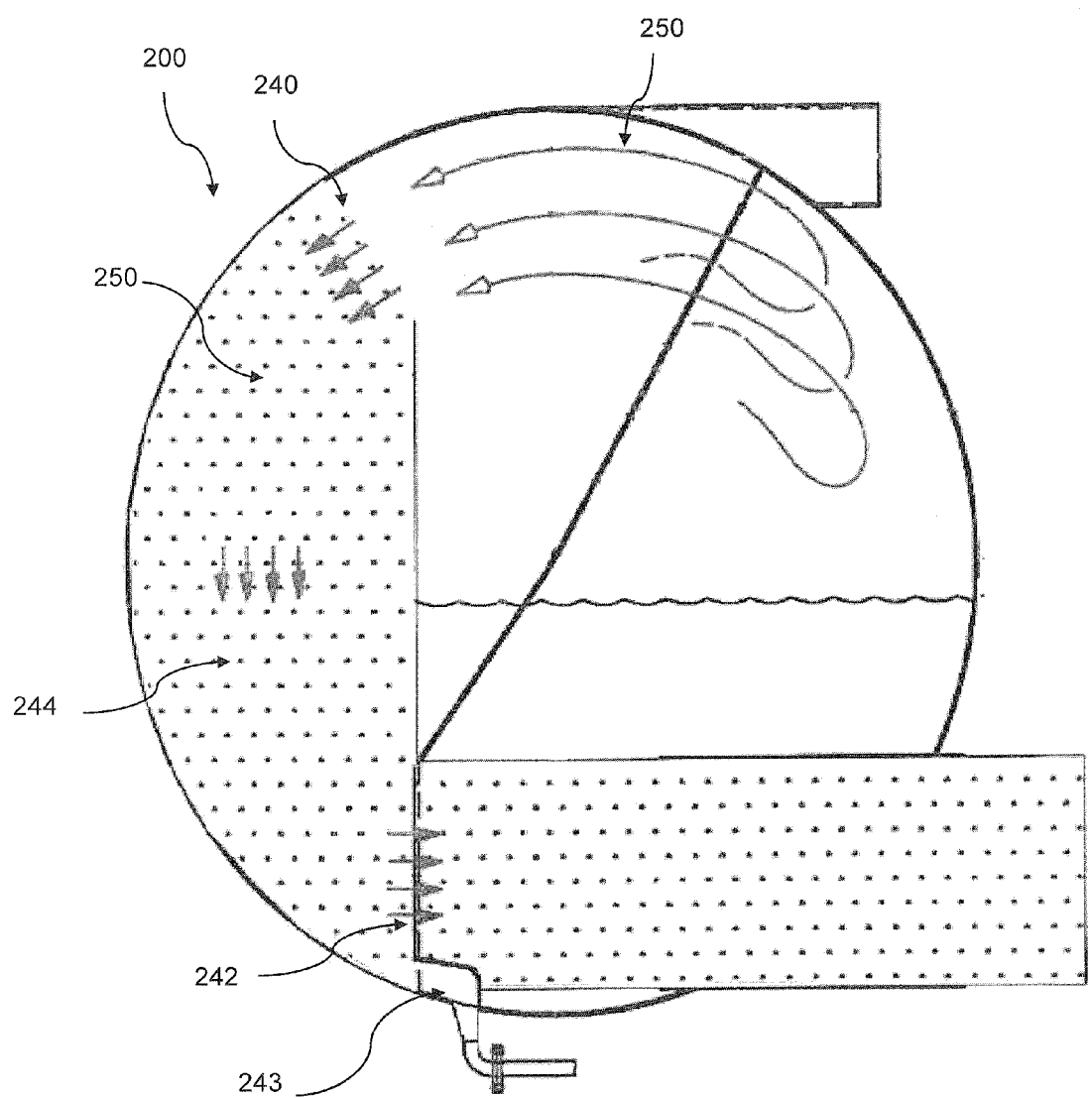
FIG. 5 is a side view of part of a mobile mechanical vapor recompression evaporator, showing a vapor chamber of a vapor separator, according to an exemplary embodiment.
Figure 6:
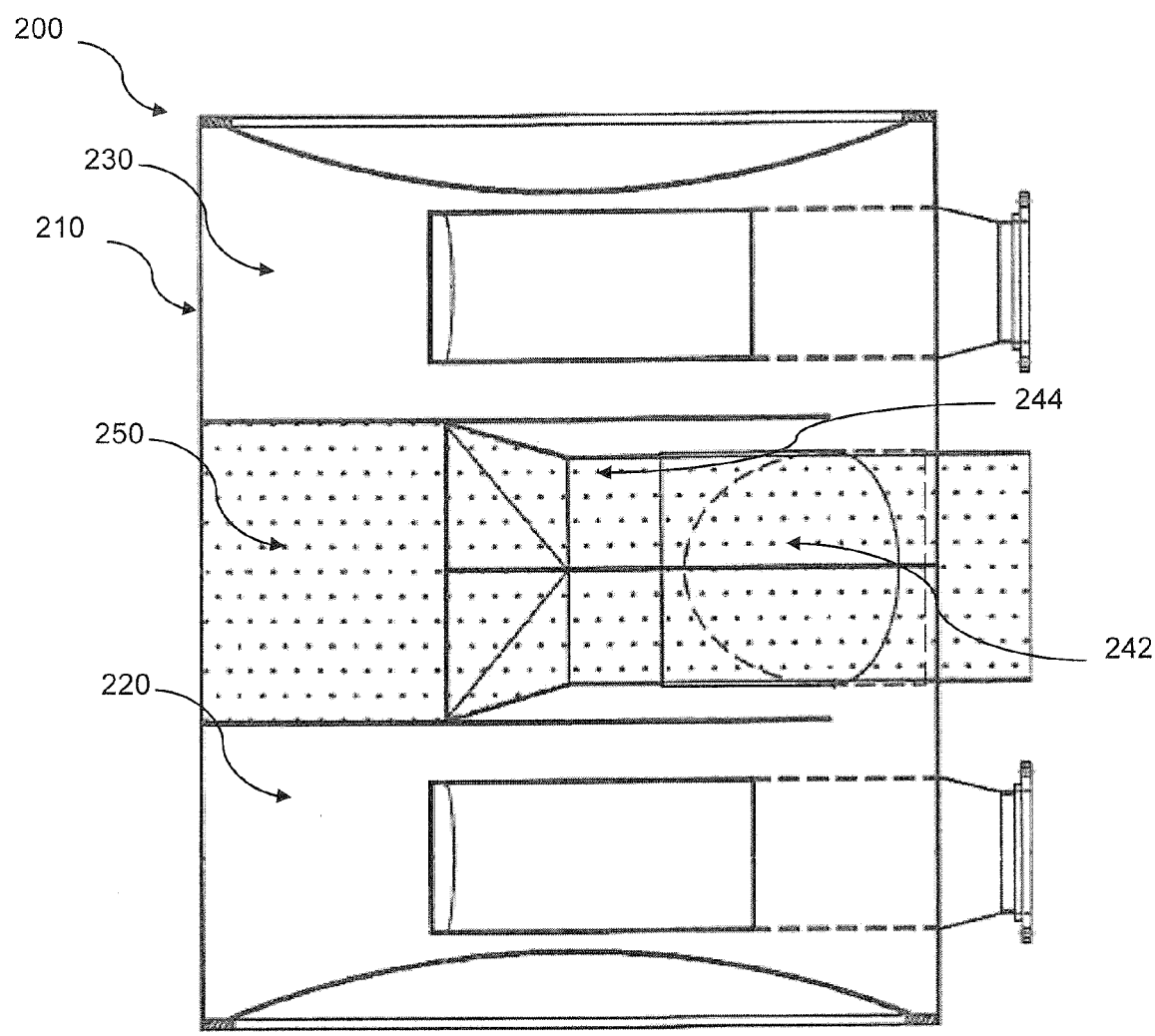
FIG. 6 is a top view of part of a mobile mechanical vapor recompression evaporator, showing three chambers of a vapor separator, according to an exemplary embodiment.

Vapor product 250 can then be forced by draft 201 through a 180° turn in the vertical plane into a vapor passage 244 comprising an elbow vapor outlet duct 242, as shown in FIGS. 5 and 6. Vapor product 250 can be drawn into outlet duct 242 by draft 201 and can flow vertically downward and can then make a 90° turn in the horizontal plane and out of vapor separator 200. Outlet duct 242 can be configured, such that liquid droplets present in vapor product 250 entering outlet duct 242 can be thrown against housing 210 wall within vapor chamber 240. These liquid droplets can stay on the wall and can be swept by vapor product 250 into a liquid scalper 243. Liquid scalper 243 can span the width of outlet duct 242 and collect the liquid droplets and from liquid scalper 243 the liquid droplets can be pumped and transferred to either first sump 223 or second sump 233. Outlet duct 242 can be in fluid communication with the suction of first fan 400. Therefore, vapor product 250 discharged from outlet duct 242 can flow to first fan 400.

Vapor separator 200 can utilize gravity forces, partial centrifugal forces, or a combination of both for separation of entrained liquid droplets from the flow of vapors. For example, vapor separator 200 can be configured to utilize impingement forces for coalescing of small droplets into large droplets that can be more easily separated from the vapor. Vapor separator 200 can be configured to be generally a gravity type separator, however, partial centrifugal forces can also be utilized. For example, outlet duct 242 can act as a partial centrifugal separator.

In consideration of the maximum height and width requirements, an overall volume of housing 210 can vary based on the design. According to an exemplary embodiment, housing 210 total volume can be about 10 $m^3$, and of that 10 $m^3$, about 6 $m^3$ can be vapor volume and 4 $m^3$ can be liquid volume. In other embodiments, the overall volume and the breakdown of the overall volume into vapor volume and liquid volume can vary.

Vapor separator 220, according to various embodiments, can be operated under a partial vacuum pressure condition. For example, the partial vacuum can range in absolute pressure between about 2 psia and about 14 psia. Operating under a partial vacuum can facilitate the evaporation (e.g., flash evaporation) of first product 222 and second product 232 within vapor separator 220 at lower temperature than product boiling temperature at atmospheric pressure, which can be advantageous in respect to fouling, corrosion, process safety, and the like.

Vapor separator 220 as described above, according to an exemplary embodiment, can be configured to receive two independent product streams (i.e., first product 222 and second product 232) from FCHE 300, while keeping the liquid streams (i.e., first liquid product 226 and second liquid product 236) from co-mingling, separate the vapors (i.e., first vapor product 225 and second vapor product 235) from the liquid streams and combine the vapor streams into a common vapor stream (i.e., vapor product 250) that can be discharged from vapor separator 220 generally free of entrained liquid droplets.

Forced Circulation Heat Exchanger

First liquid product 226 and second liquid product 236 within first sump 223 and second sump 233 can be pumped using two or more of the plurality of pumps 600 to FCHE 300. According to an exemplary embodiment, FCHE 300 can have a first product pass 310 and a second product pass 320. First product pass 310 can circulate first liquid product 226 and second product pass 320 can circulate second liquid product 236. First product pass 310 and second product pass 320 can be configured so there is no co-mingling of first liquid product 226 and second liquid product 236.

Figure 7A:
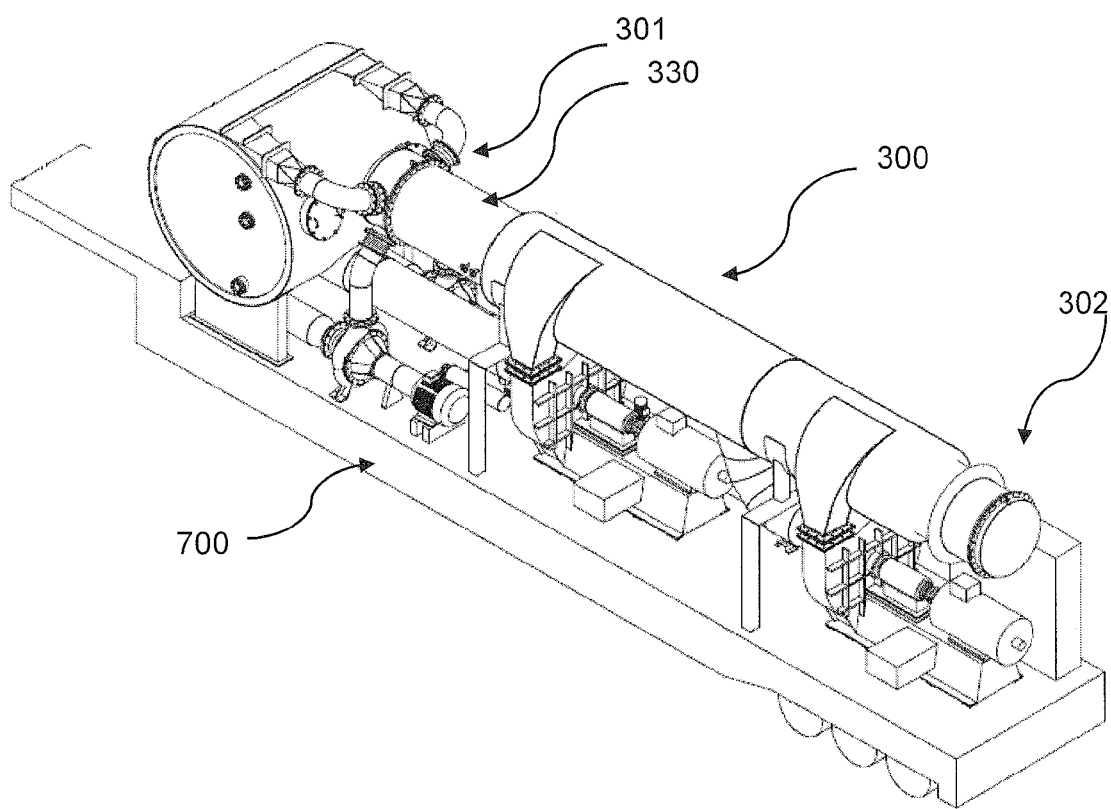
FIG. 7A is a side perspective view of part of a mobile mechanical vapor recompression evaporator, showing a forced circulation heat exchanger, according to an exemplary embodiment.

As shown in FIG. 7A, FCHE 300 can have a first end 301 and a second end 302. FCHE 300 can be coupled to trailer 700 in a generally horizontal orientation. Between first end 301 and second end 302, FCHE 300 can comprise an inner shell 330 forming a generally cylindrical tube or another suitable shape.

Figure 7B:
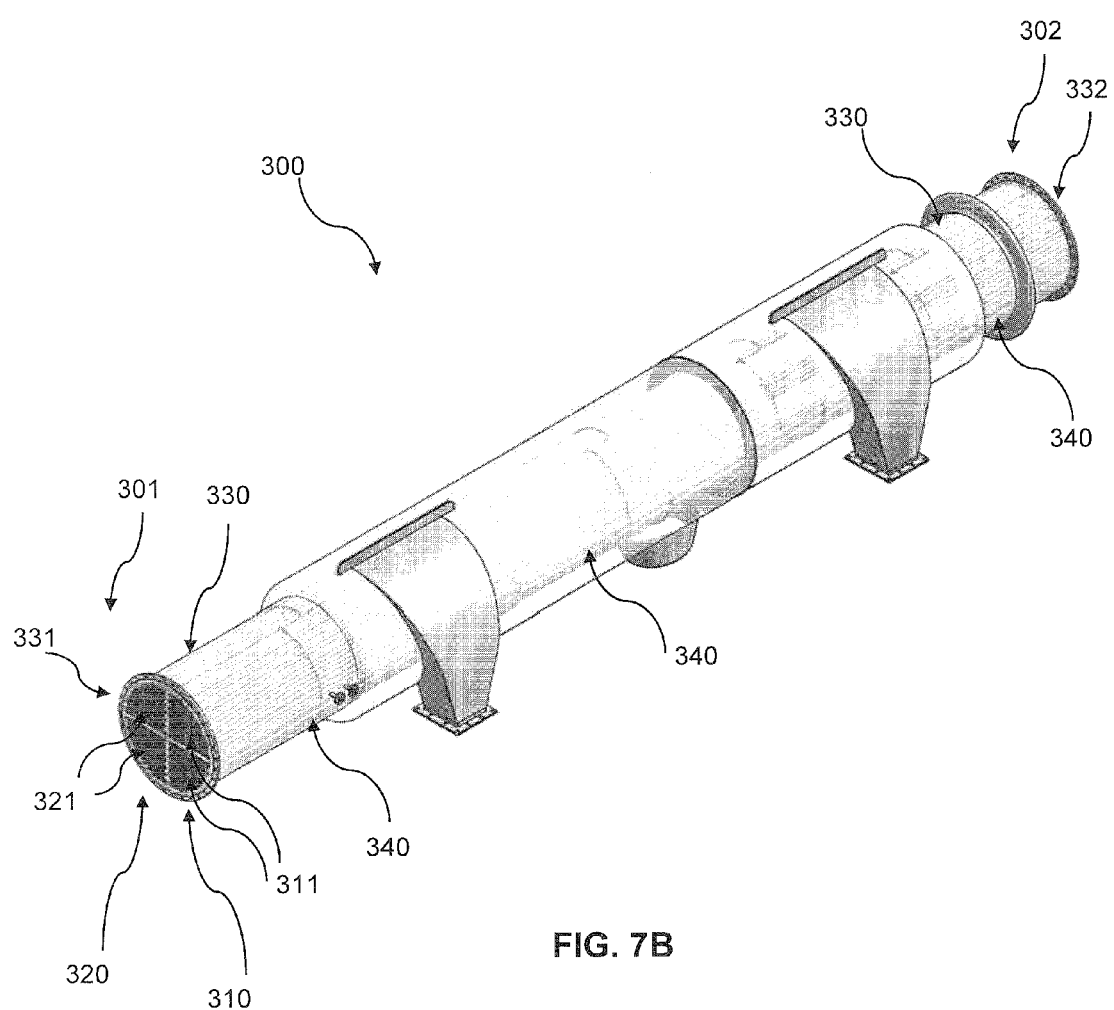
FIG. 7B is a side perspective view of part of a mobile mechanical vapor recompression evaporator, showing the inside of part of a forced circulation heat exchanger, according to an exemplary embodiment.

As shown in FIG. 7B, within inner shell 330 first product pass 310 can comprise a first plurality of tubes 311 that can run the length of inner shell 330. In addition, within inner shell 330 second product pass 320 can comprise a second plurality of tubes 321 that can run the length of inner shell 330. In other embodiments, the configuration of first product pass 310 and second product pass 320 can vary. For example, in another embodiment, first product pass 310 can be located in the upper half of inner shell 330 and second product pass 320 can be located in the lower half of inner shell 330. In yet another embodiment, inner shell 330 can have a single pass, triple pass, or more.

FCHE 300 can further comprise a pair of tube sheets located at each end of inner shell 330. The pair of tube sheets can comprise a first tube 331 located nearest to first end 301 and a second tube sheet 332 can be located nearest to second end 302. First tube sheet 331 can be welded to first plurality of tubes 311 and second plurality of tubes 321 at the ends nearest first end 301 and the outer wall of inner shell 330. Second tube sheet 332 can be welded to first plurality of tubes 311 and second plurality of tubes 321 at the ends nearest second end 302 and the outer wall of inner shell 330. Welding first tube sheet 331, second tube sheet 332, first plurality of tubes 311, second plurality of tubes 321, and inner shell 330 can create an enclosed vapor space 340 located between the inner wall of inner shell 330 and the outer walls of first plurality of tubes 311 and second plurality of tubes 321.

Figure 8A:
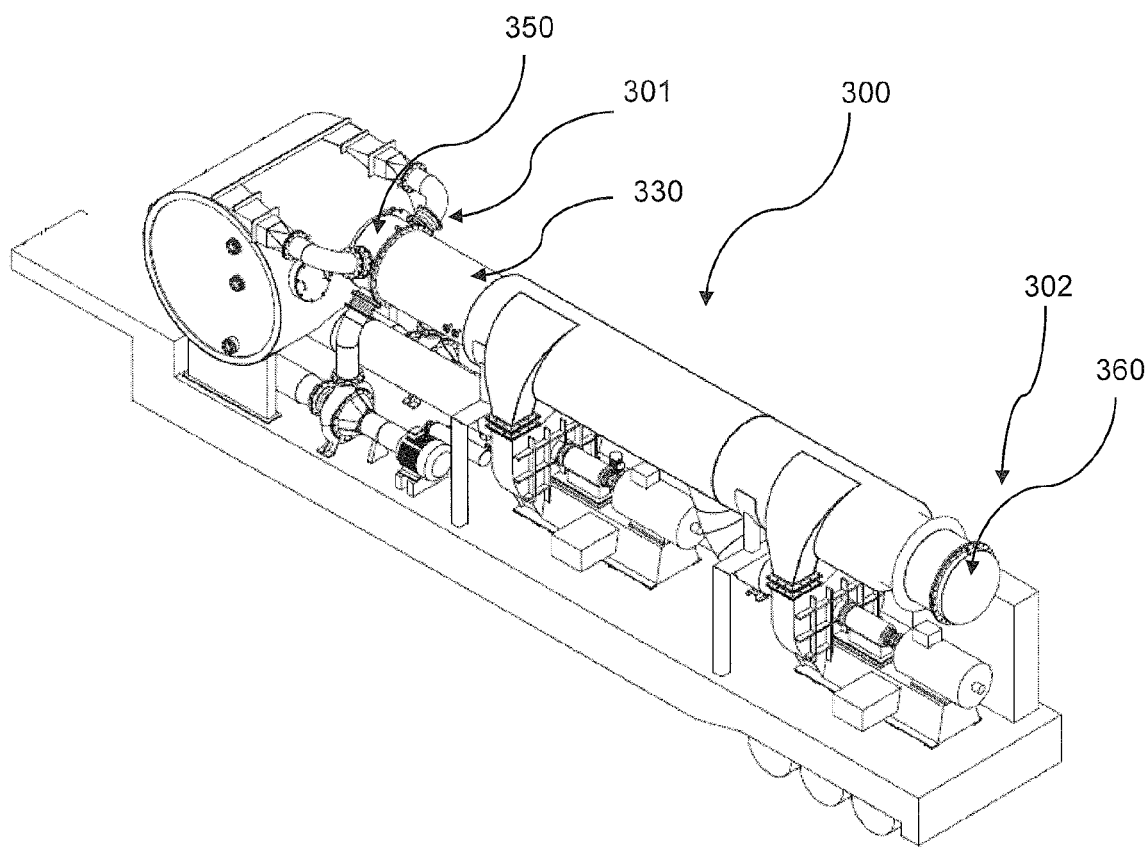
FIG. 8A is a side perspective view of part of a mobile mechanical vapor recompression evaporator, showing a forced circulation heat exchanger, according to an exemplary embodiment.
Figure 8B:
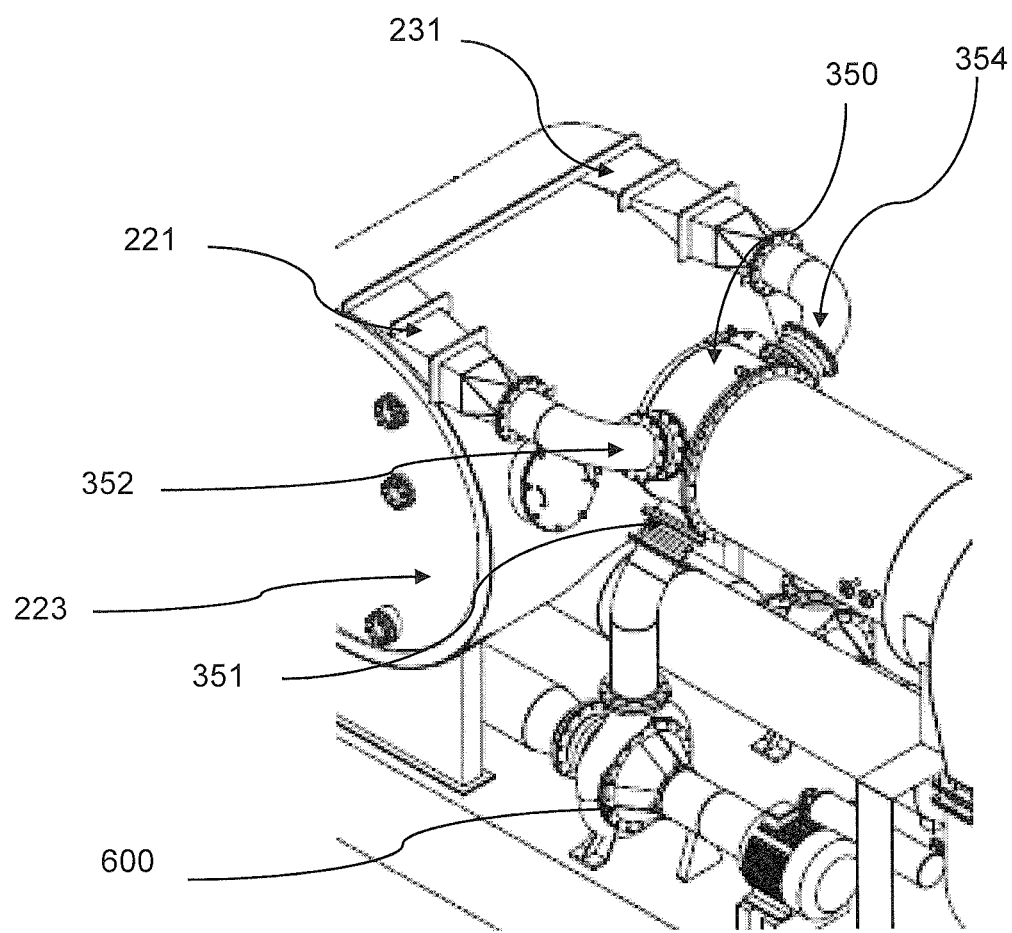
FIG. 8B is an enlarged side perspective view of part of a mobile mechanical vapor recompression evaporator, according to an exemplary embodiment.
Figure 8C:
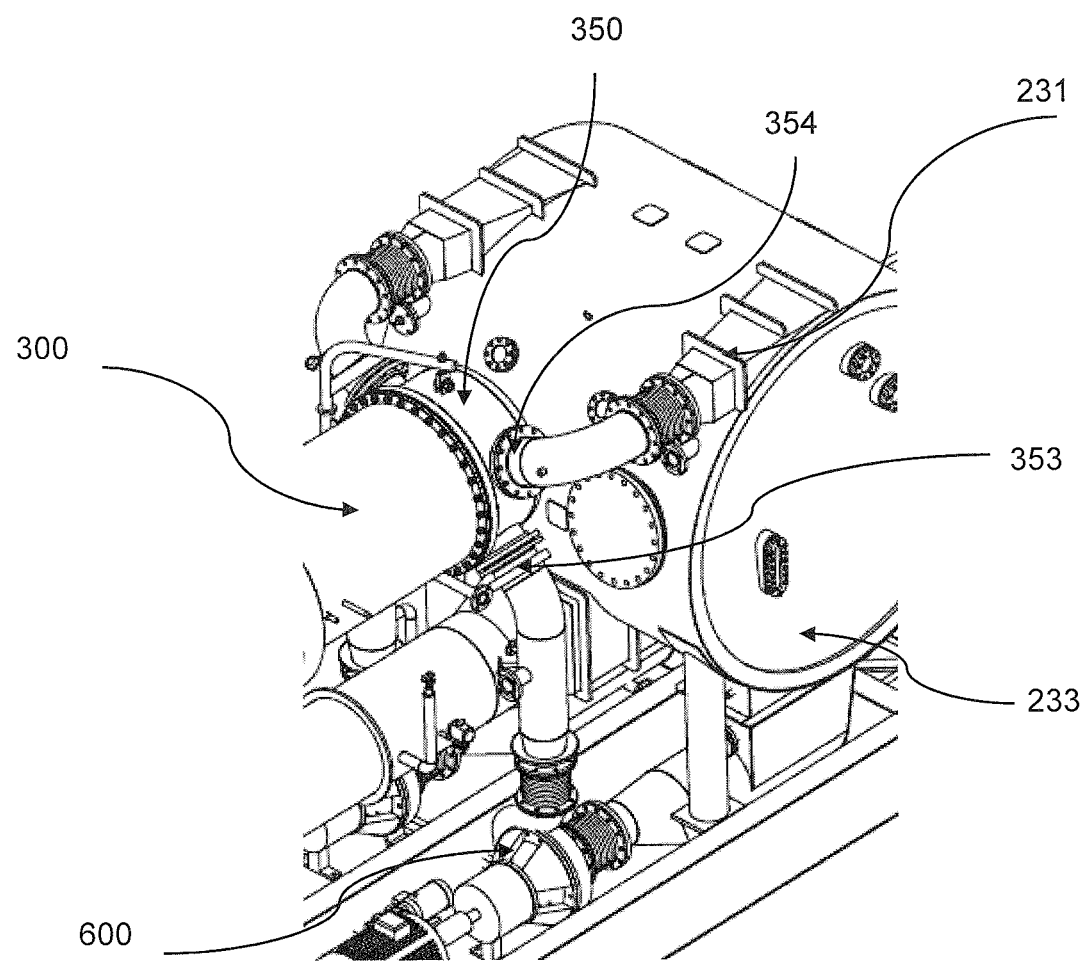
FIG. 8C is an enlarged side perspective view of part of a mobile mechanical vapor recompression evaporator, according to an exemplary embodiment.

As shown in FIG. 8A, FCHE 300 can further comprise a first end products chamber 350 and a second end products chamber 360. First end products chamber 350 can be configured to couple to inner shell 330 in the region of first end 301. As shown in FIGS. 8B and 8C, first end products chamber 350 can comprise a first product inlet 351, a first product outlet 352, a second product inlet 353, a second product outlet 354.

First product inlet 351 can be in fluid communication with first sump 223. Between first product inlet 351 and first sump 223 can be one of the plurality of pumps 600 configured to pump first liquid product 226 from first sump 223 to FCHE 300.

Second product inlet 353 can be in fluid communication with second sump 233. Between second product inlet 353 and second sump 233 can be one of the plurality of pumps 600 configured to pump second liquid product 236 from second sump 233 to FCHE 300.

First product outlet 352 can be in fluid communication with first product passage 221. Second product outlet 354 can be in fluid communication with second product passage 231.

Figure 9:
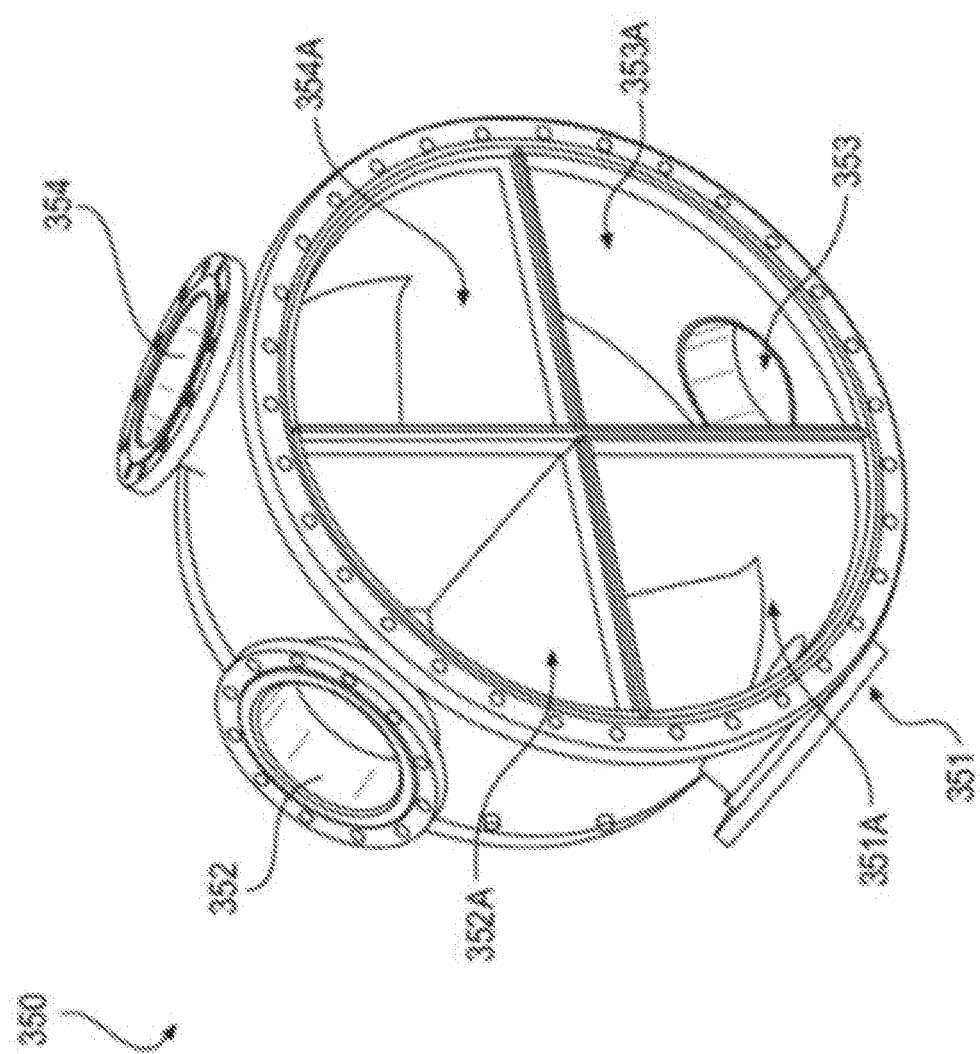
FIG. 9 is an enlarged side perspective view of part of a mobile vapor recompression evaporator, showing first end products chamber, according to an exemplary embodiment.

As shown in FIG. 9, first end products chamber 350 can be separated into four separate chambers, first product inlet chamber 351A, first product outlet chamber 352A, second product inlet chamber 353A, and second product outlet chamber 354A. Each chamber can be isolated from the other three chambers.

Figure 10:
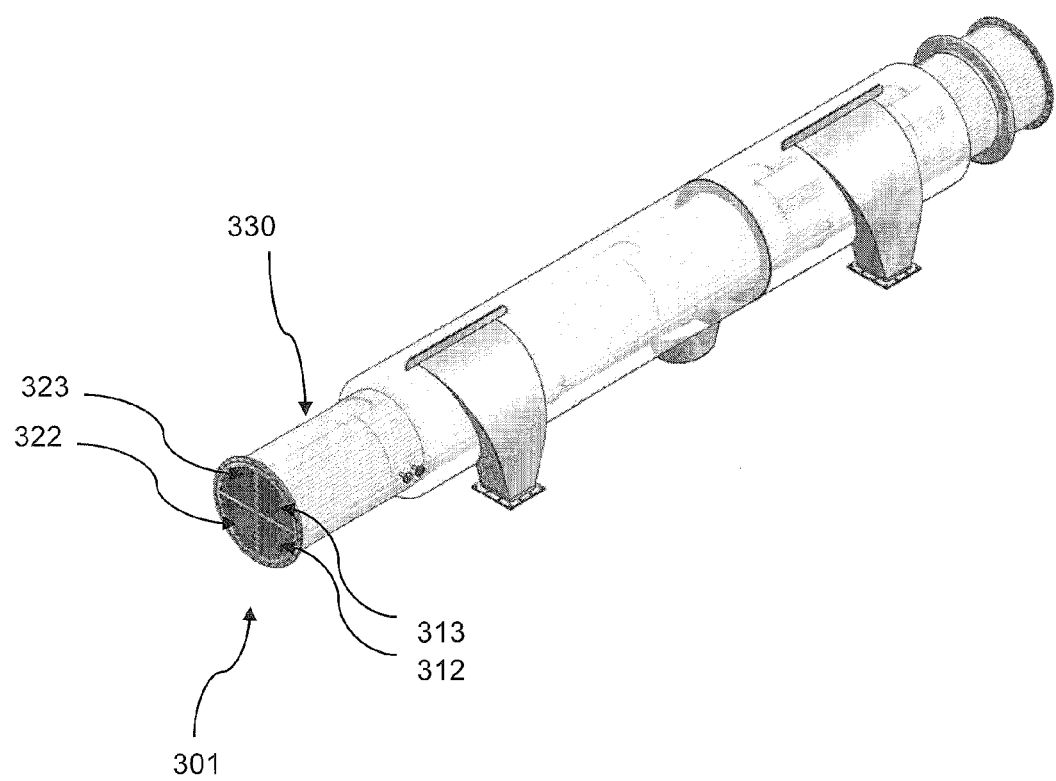
FIG. 10 is a side perspective view of part of a mobile mechanical vapor recompression evaporator, showing a part of the inside of force circulation heat exchanger, according to an exemplary embodiment.

As shown in FIG. 10, according to an exemplary embodiment, first plurality of tubes can comprise a first half first plurality of tubes 312, which can be positioned in the lower right section of inner shell 330 and a second half first plurality of tubes 313, which can be positioned in the upper right section of inner shell 330 when looking at inner shell from first end 301. Second plurality of tubes can comprise a first half second plurality of tubes 322, which can be positioned in the lower left section of inner shell 330 and a second half second plurality of tubes 323, which can be positioned in the upper left section of inner shell 300 when looking at inner shell from first end 301.

First product inlet chamber 351A can be configured to receive first liquid product 226 through first product inlet 351 and allow first liquid product 226 to flow into the inlet of first product pass 310 by flowing inside first half first plurality of tubes 312.

First product outlet chamber 352A can be configured to receive first liquid product 226 from outlet of first product pass 310 and allow first liquid product 226 to flow out first product outlet 352.

Second product inlet chamber 353A can be configured to receive second liquid product 236 through second product inlet 353 and allow second liquid product 236 to flow into second product pass 320 by flowing inside first half second plurality of tubes 322.

Second product outlet chamber 354A can be configured to receive second liquid product 236 from outlet of second product pass 320 and allow second liquid product 326 to flow out second product outlet 354.

Figure 11:
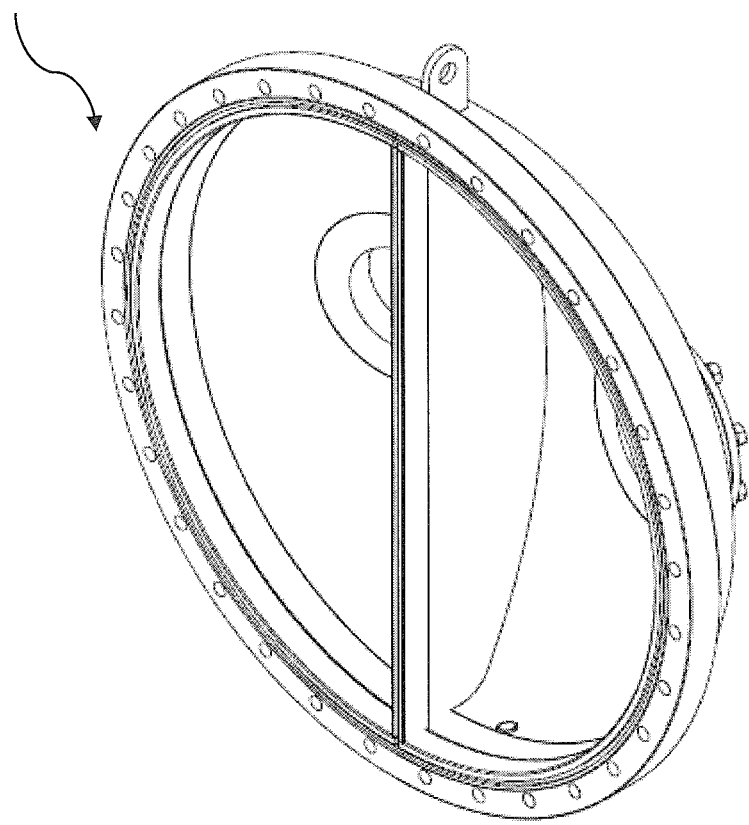
FIG. 11 is an enlarged side perspective view of part of a mobile vapor recompression evaporator, showing a second end products chamber, according to an exemplary embodiment.

FIG. 11 shows second end products chamber 360, according to an exemplary embodiment. Second end products chamber 360 can be divided into two separate chambers, one chamber for first product pass 310 and another chamber for second product pass 320. The chamber for first product pass 310 can be configured to re-direct flow of first liquid product 226 from first half first plurality of tubes 312 back through second half first plurality of tubes 313. The chamber for second product pass 320 can be configured to re-direct flow of second liquid product 236 from first half second plurality of tubes 322 back through second half second plurality of tubes 323.

The flow rate of first liquid product 226 through first product pass 310 and the flow rate of second liquid product 236 through second product pass 320 can vary. For example, first liquid product 226 can be pumped through first product pass 310 using one of plurality of pumps 600 at a flow rate between about 1000 gpm to about 2000 gpm. Second liquid product 236 can be pumped through second product pass 310 using one of plurality of pumps 600 at a flow rate between about 1000 gpm to about 2000 gpm. The flow rates of each product pass can be controlled by controlling the speed of the corresponding pump using variable frequency drives (VFDs).

Figure 12A:
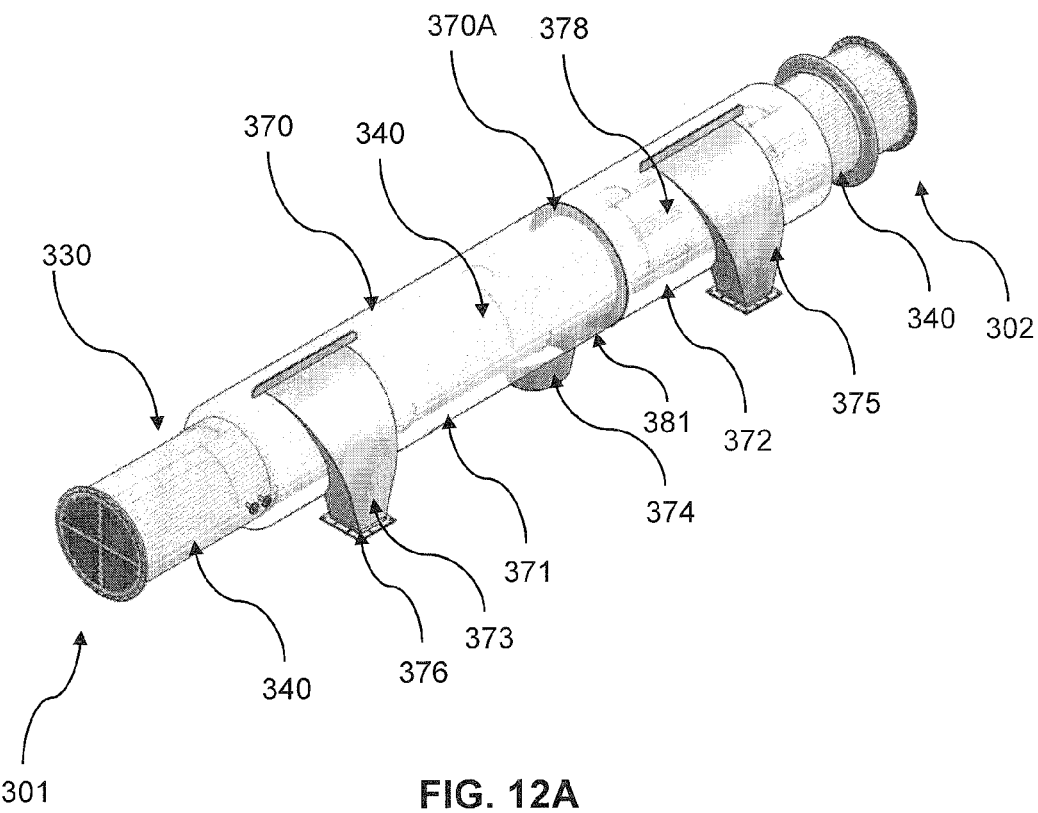
FIG. 12A is a side perspective view of part of a mobile mechanical vapor recompression evaporator, according to an exemplary embodiment.

FIG. 12A shows FCHE 300, according to an exemplary embodiment. FCHE 300 can further comprise an outer shell 370. Outer shell 370 can form a generally cylindrical tube or other suitable shape configured to wrap around a portion of inner shell 330 between first end 301 and second end 302. Each end of outer shell 370 can be sealed so the space between inner shell 300 and outer shell 370 is enclosed. The space between inner shell 300 and outer shell 370 can be divided by a partition 370A, which forms a first bustle 371 and a second bustle 372. Partition 370A can be configure so first bustle 371 is sealed off from second bustle 372. First bustle 371 can be located nearer to first end 301 and second bustle 372 can be located nearer to second end 302.

In other embodiments, FCHE 300 can have more or less bustles. For example, the space between inner shell 300 and outer shell 370 can form a single bustle. In yet another embodiment, the space between inner shell 300 and outer shell 370 can form three or more bustles. The number of fans MMVRE 100 includes can correspond to the number of bustles.

Figure 13A:
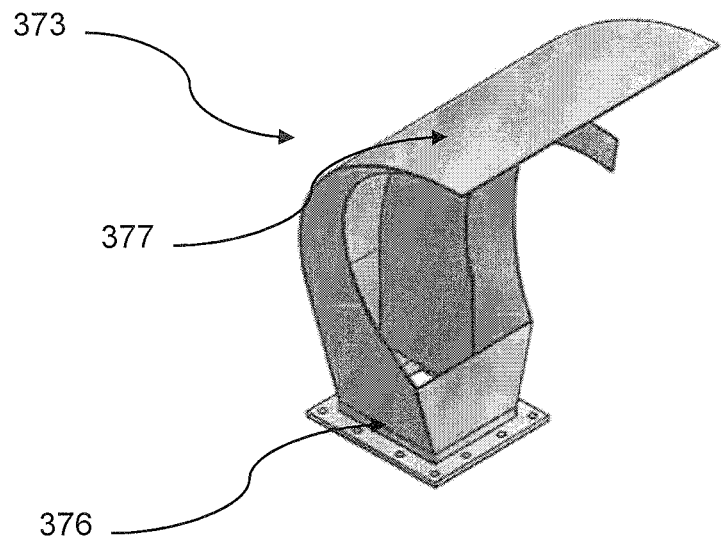
FIG. 13A is a side perspective view of part of a mobile mechanical vapor recompression evaporator, showing a first vapor inlet duct, according to an exemplary embodiment.

As shown in FIG. 12A, first bustle 371 can comprise a first vapor inlet duct 373 and a first outlet passage 374. First vapor inlet duct 373 can be in fluid communication with the discharge of first fan 400 (not shown in FIG. 12A). First vapor inlet duct 373 can have an opening 376 having a trapezoidal geometry. In other embodiments, opening 376 can have a geometry that is circular, rectangular, or triangular. As shown in FIG. 13A, opening 376 can expand outward to form a curved duct member 377 that couples to the rounded exterior of outer shell 370. First vapor inlet duct 373 can be configured to receive vapor product 250 from first fan 400 tangentially to the arc of curved duct member 377 and introduce vapor product 250 into first bustle 371.

First outlet passage 374 can be configured to discharge vapor product 250 from first bustle 371. As shown in FIG. 12A, first outlet passage 374 can be located on the underside of outer shell 370 between first vapor inlet duct 373 and partition 370A.

First outlet passage 374 can be in fluid communication with second fan 500 (not shown in FIG. 12A). Therefore, vapor 250 discharged from first outlet passage 374 can be introduced into second fan 500.

Figure 12B:
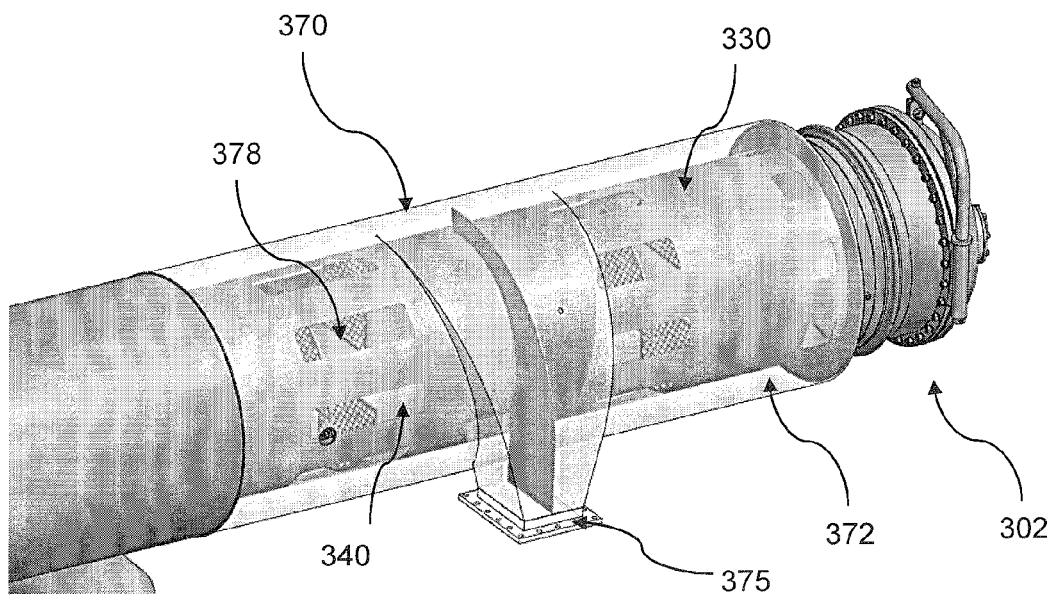
FIG. 12B is a side perspective view of part of a mobile mechanical vapor recompression evaporator, according to an exemplary embodiment.
Figure 13B:
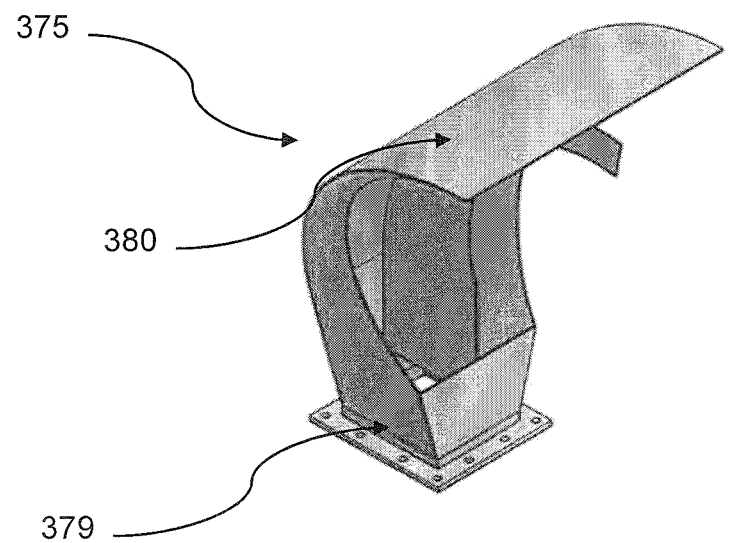
FIG. 13B is a side perspective view of part of a mobile mechanical vapor recompression evaporator, showing a second vapor inlet duct, according to an exemplary embodiment.

As shown in FIGS. 12A and 12B, second bustle 372 can comprise a second vapor inlet duct 375 and one or more of a vapor opening 378. Second vapor inlet duct 375 can be in fluid communication with the discharge of second fan 500 (not shown in FIGS. 12A and 12B). As shown in FIG. 13B, second vapor inlet duct 375 can have an opening 379 having a trapezoidal opening. In other embodiments, opening 379 can have a geometry that is circular, rectangular, or triangular. Opening 379 can expand outward to form a curved duct member 380 that couples to the rounded exterior of outer shell 370. Second vapor inlet duct 375 can be configured to receive vapor product 250 from second fan 500 tangentially to the arc of curved duct member 380 and introduce vapor product 250 into second bustle 372.

First inlet duct 373 and second inlet duct 375 can be configured to minimize the amount of pressure lost by vapor product 250 while flowing through each duct.

As shown in FIGS. 12A and 12B, vapor opening 378 can comprise cutouts through inner shell 330. Vapor opening 378 can be configured to allow passage of vapor product 250 from second bustle 372 into vapor space 340. Vapor product 250 within vapor space 340 can contact the outer surface of first plurality of tubes 311 and second plurality of tubes 312 of first product pass 310 and second product pass 320. Vapor product 250 can transfer heat through the tubes to the first liquid product 226 and second liquid product 236 circulating within the tubes. Vapor product 250 can condense on the tubes and form condensate 130. Condensate 130 can be collected by gravity at the bottom of inner shell 330 and be discharged through a condensate outlet passage 381.

In other embodiments, condensate 130 can be pumped from condensate outlet passage 381. A portion of condensate 130 can be sent to a spray nozzle in first fan 400 and second fan 500 configured to suppress excessive superheating of vapor product 250.

The heat transferred from vapor product 250 to first liquid product 226 and second liquid product 236 can cause both to increase in temperature while circulating through FCHE 300. First liquid product 226 discharged from FCHE 300 can have a greater temperature than first liquid product 226 fed to FCHE 300. First liquid product 226 discharge from FCHE 300 can be supplied to vapor separator 200 as first product 222. Second liquid product 236 discharged from FCHE 300 can have a greater temperature than second liquid product 236 fed to FCHE 300. Second liquid product 236 discharge from FCHE 300 can be supplied to vapor separator 200 as second product 232.

The rise in temperature of first liquid product 226 and second liquid product 236 within FCHE 300 can depend on many variables. For example, initial temperature of first liquid product 226 and second liquid product 236, circulation flow rate, temperature of vapor product 250, flow rate of vapor product 250, ambient temperature, fouling of tubes in product passes, concentration of first liquid product 226 and second liquid product 236, boiling point elevation, and the like.

First Fan & Second Fan

Figure 14:
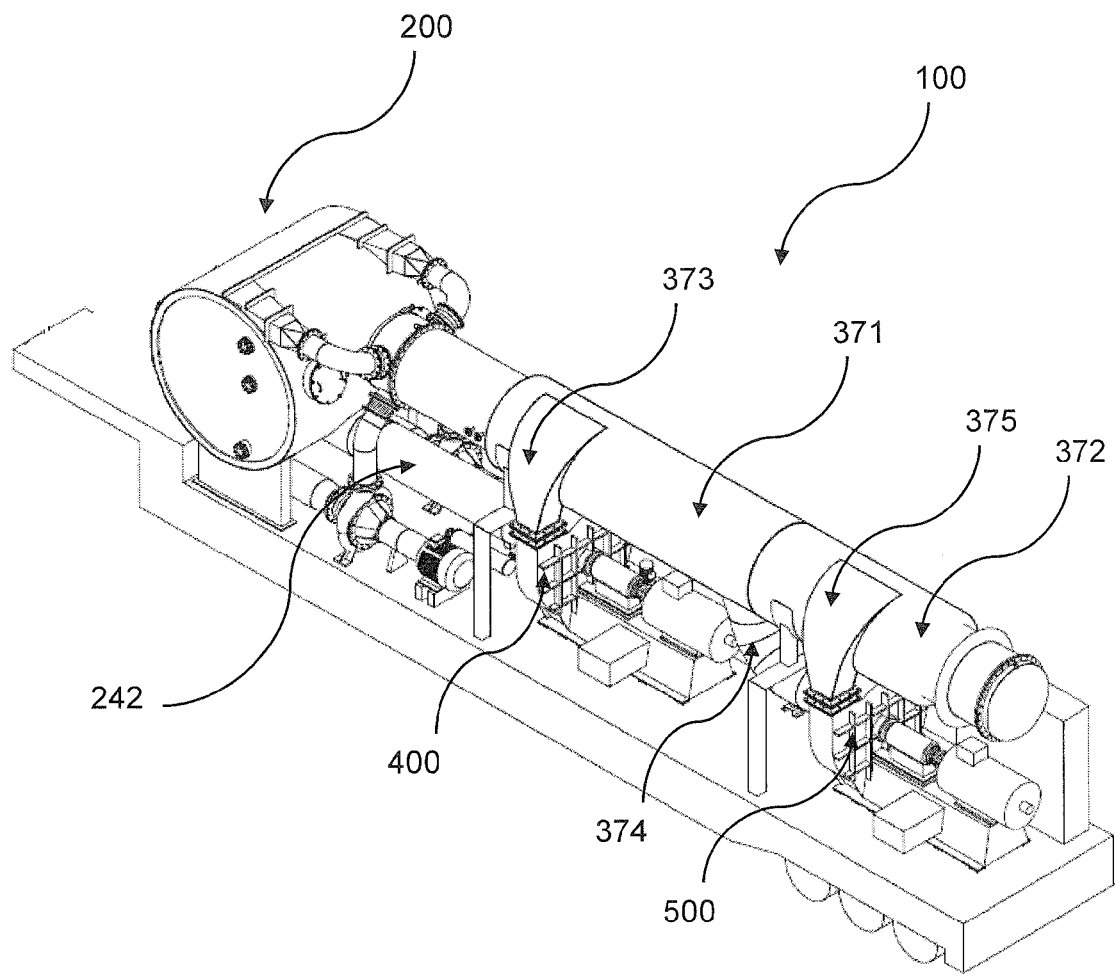
FIG. 14 is a side perspective view of a part of a mobile mechanical vapor recompression evaporator, according to an exemplary embodiment.

First Fan 400 is shown in FIG. 14, according to an exemplary embodiment. The suction to first fan 400 can be in fluid communication with outlet duct 242 and the discharge of first fan 400 can be in fluid communication with first vapor inlet duct 373. First fan 400 can be connected to a motor controlled by a VFD. The VFD can be used to control the speed and performance of first fan 400. First fan 400 can be configured to increase the pressure of vapor product 250 discharged from vapor separator 200 to an intermediate pressure and deliver vapor product 250 at the intermediate pressure into first bustle 371. For example, first fan 400 can receive vapor product 250 at a pressure of between about 3 psia to about 4 psia and increase that pressure to about 4 psia to about 5.5 psia. In addition, first fan can also add heat to vapor product 250 as it passes through first fan 400. The amount of heat added can mostly be a function of electric power absorbed by first fan 400.

Second Fan 500 is shown in FIG. 14, according to an exemplary embodiment. The suction to second fan 500 can be in fluid communication with first outlet passage 374 and discharge of second fan 500 can be in fluid communication with second vapor inlet duct 375. Second fan 500 can be connected to a motor controlled by a VFD. The VFD can be used to control the speed and performance of second fan 500. Second fan 500 can be configured to increase the intermediate pressure of vapor product 250 from first bustle 371 to a final pressure and deliver vapor product 250 at final pressure into second bustle 372. For example, first fan 500 can receive vapor product 250 at an intermediate pressure of between about 4 psia to about 5.5 psia and increase that pressure to between about 5.5 psia to about 7.5 psia. In addition, second fan can also add heat to vapor product 250 as it passes through second fan 500. The amount of heat added can mostly be a function of electric power absorbed by second fan 500. In other embodiments, vapor product 250 can increase in vapor pressure up to about 30 psia while being compressed through second fan 500.

Operation

When starting MMVRE 100 an initial preheating of product 110 supplied to MMVRE 100 can be conducted to raise the temperature of product 110 to the boiling temperature based on the concentration, at which evaporation can commence. Steady state operation can be reached sometime after preheating is initiated. The time to reach steady state operation can depend on many factors, for example, startup heater capacity, product 110 temperature, product 100 concentration, ambient temperature, etc.

According to various embodiments, vapor separator 220 can be configured so first liquid product 226 in first sump 223 can be transferred to second sump 233 and combine with second liquid product 236. For example, when there is excess first liquid product 226 in first sump 223, first liquid product 226 can be pumped to second sump 233 by one of the plurality of pumps 600. The level in second sump 233 can be controlled by bleeding a portion of second liquid product 236 from second sump 233, which can constitute concentrate 120. In addition, the concentration of second liquid product 236 in second sump 233 can be controlled, maintained, or combination of both by bleeding a portion of second liquid product 236 from second sump 233, which can constitute concentrate 120.

Accordingly, vapor separator 200 can be configured so that the concentration of TDS of first liquid product 226 is generally less than the concentration of TDS of second liquid product 236. In addition, during steady state operation, second liquid product 236 within second sump 233 can be at a final TDS concentration, which is substantially equal to the TDS concentration of concentrate 120 that can be discharged from MMVRE 100.

MMVRE 100 according to an exemplary embodiment, can be configured to operate utilizing an electrical power source at typically about 460V to about 480V at a peak of about 350 kW. MMVRE 100 can be configured to startup and operate at a substantially steady state without the need for a steam or ancillary energy source besides the electrical power source.

According to various embodiments, once MMVRE 100 has reached steady state, the heat balance within MMVRE 100 can be maintained positive.

Vapor separator 200, FCHE 300, and the interconnecting piping can be formed of one or more metals, metal alloys, or super duplex alloys, for example, 304 stainless steel, 316 stainless steel, alloy 2507, grade 1 titanium, grade 2 titanium, grade 11 titanium, and the like. The material selected can be based on the composition and concentration of product 110, whether the component contacts product 110, and the operating temperatures of MMVRE 100.

According to various embodiments, plurality of pumps 600 can comprise a variety of different pumps. For example, centrifugal pumps, rotary lobe pumps, metering pumps, vacuum pumps, diaphragm pumps, and the like.

MMVRE 100, according to various embodiments, can comprise a plurality of instruments (e.g., temperature transmitters, pressure transmitters, TDS meters, flow meters, and the like) and a plurality of valves (e.g., ball valves, butterfly valves, control valves, pressure relief valves, and the like). The plurality of instruments and valves can be used to control the flow rate, temperature, concentration, volume, location of the liquid and vapor products within MMVRE 100. MMVRE 100 can further comprise a control system configured to interface with the plurality of instruments, plurality of valves, plurality of pumps and motors to operate MMVRE 100. The control system can include a computer, PLC, or the like that can be programmed to control MMVRE manually, automatically, or a combination of both.

In other embodiments, MMVRE 100 can further comprise preheaters, a feed system having tanks, a degasser, additional heat exchangers, and the like.

According to various embodiments, MMVRE 100 can be configured to operate in steady state operation for a period of a few hours up to several weeks.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A mobile mechanical vapor recompression evaporator system comprising:
    a vapor separator comprising:
        a generally cylindrical housing configured in a generally horizontal orientation comprising:
            at least one product chamber having at least one product passage configured to receive at least one product;
            at least one vapor chamber having at least one vapor passage; and
            at least one vapor window located between the at least one product chamber and the at least one vapor chamber;
            wherein a portion of the at least one product evaporates in the product chamber to produce a vapor that passes through the at least one vapor window into the at least one vapor chamber, and is discharged through the at least one vapor passage; and
    a forced circulation heat exchanger comprising:
        an inner shell forming a generally cylindrical tube in a generally horizontal orientation;
        at least one product pass having a plurality of tubes within the inner shell and a product inlet passage and a product outlet passage configured to circulate the at least one product through the plurality of tubes;
        a vapor space formed between the inner shell and outer walls of the plurality of tubes;
        an outer shell forming a generally cylindrical tube configured to encompass a portion of the inner shell and creating a first bustle and a second bustle, the first bustle comprising a first vapor inlet duct and a first outlet passage, and the second bustle comprising a second vapor inlet duct and at least one vapor opening between the second bustle and the vapor space within the inner shell; and
        a condensate outlet passage;
        wherein the system is configured so that the vapor from the at least one vapor passage of the vapor separator flows through the first vapor inlet duct into the first bustle, through the first outlet passage, through the second vapor inlet duct into the second bustle, and through the vapor opening into the vapor space with the inner shell to contact the outer walls of the plurality of tubes and form a condensate;
        a first fan positioned between the at least one vapor passage and the first vapor inlet duct; and
        a second fan positioned between the first outlet passage and the second vapor inlet duct;
        wherein the first fan is configured to receive the vapor from the at least one vapor passage and raise the pressure to an intermediate pressure and discharge the vapor, and the second fan is configured to raise the pressure of the vapor from the intermediate pressure to a final pressure and discharging the vapor into the second bustle.

2. The mobile mechanical vapor recompression evaporator system of claim 1, wherein the mobile mechanical vapor recompression evaporator system is mounted on a trailer configured for transportation on public roads and highways.

3. The mobile mechanical vapor recompression evaporator system of claim 1, wherein the mobile mechanical vapor recompression evaporator system is powered by an electrical power supply operating at about 460 volts to about 480 volts.

4. The mobile mechanical vapor recompression evaporator system of claim 1, wherein the at least one product is hydro-fracturing wastewater having an initial TDS up to about 150,000 mg/l and the condensate produced has a TDS below about 500 mg/l.

5. The mobile mechanical vapor recompression evaporator system of claim 1, wherein the vapor separator operates under a partial vacuum having a range in absolute pressure between about 2 psia and about 14 psia.

6. The mobile mechanical vapor recompression evaporator system of claim 1, wherein the vapor space within the inner shell operates within a range in absolute pressure between about 5 psia and about 30 psia.

7. The mobile mechanical vapor recompression evaporator system of claim 1, wherein the system is configured so that the heat balance is positive after establishing steady state operation.

8. The mobile mechanical vapor recompression evaporator system of claim 1, wherein the at least one product comprises a first product and a second product, and the vapor separator comprises a first product chamber and a second product chamber, wherein the second product in the second product chamber is at a final concentration and the final concentration is higher than a concentration of the first product in the first product chamber.

9. A mechanical vapor recompression evaporator system comprising:
a vapor separator having a housing comprising:
a first product chamber having a first product passage configured to receive a first product;
a second product chamber having a second product passage configured to receive a second product;
a vapor chamber positioned between the first product chamber and the second product chamber having a vapor passage;
a first vapor window located between the first product chamber and the vapor chamber;
a second vapor window located between the second product chamber and the vapor chamber;
a first sump located in a lower section of the first product chamber configured to receive the first product that does not evaporate;
a second sump located in a lower section of the second product chamber configured to receive the first product that does not evaporate;
wherein:
a portion of the first product that evaporates in the first product chamber to produce a first vapor is configured to pass through the first window into the vapor chamber;
a portion of the second product that evaporates in the second product chamber to produce a second vapor is configured to pass through the second window into the vapor chamber; and
the first vapor and the second vapor combine and is discharged through the at least one vapor passage as a vapor;
a forced circulation heat exchanger comprising:
an inner shell forming a generally cylindrical tube in a generally horizontal orientation;
a first product pass having a first plurality of tubes within the inner shell and a first product inlet passage and a first product outlet passage in fluid communication with the first product chamber, configured to circulate the first product through the plurality of tubes;
a second product pass having a second plurality of tubes within the inner shell and a second product inlet passage and a second product outlet passage in fluid communication with the second product chamber, configured to circulate the second product through the plurality of tubes;
a vapor space formed between the inner shell and outer walls of the first plurality of tubes and the second plurality of tubes;
an outer shell forming a generally cylindrical tube configured to encompass a portion of the inner shell and creating a first bustle and a second bustle, the first bustle comprising a first vapor inlet duct and a first outlet passage, and the second bustle comprising a second vapor inlet duct and at least one vapor opening between the second bustle and the vapor space within the inner shell; and
a condensate outlet passage;
a first fan positioned between the at least one vapor passage and the first vapor inlet duct; and
a second fan positioned between the first outlet passage and the second vapor inlet duct;
wherein the first fan is configured to receive the product vapor from the at least one vapor passage and raise the pressure to an intermediate pressure and discharge the product vapor into the first bustle, and the second fan is configured to raise the pressure of the product vapor from the first bustle at the intermediate pressure to a final pressure and discharge the product vapor into the second bustle.

10. The system of claim 9, wherein at least one of the first product passage and second product passage is trapezoidal shape and configured to distribute the first product or the second product the width of the first product chamber or the second product chamber.

11. The system of claim 9, wherein:
the first product passage has a first orifice configured to create a backpressure on the first product to suppress evaporation of the first product upstream of the first orifice within the forced circulation heat exchanger; and
the second product passage has a second orifice configured to create a backpressure on the second product to suppress evaporation of the second product upstream of the second orifice within the forced circulation heat exchanger.

12. The system of claim 9, wherein the first product chamber and the vapor chamber are separated by a first partition and the second product chamber and the vapor chamber are separated by a second partition such that a volume of the first product chamber, a volume of the second product chamber, and a volume of the vapor chamber are substantially the same.

13. The system of claim 9, wherein the vapor separator includes at least one removable mesh demister pad located in the at least one of the first product chamber and the second product chamber configured to capture entrained product liquid droplets by contact with the surface of the demister pad.

14. The vapor separator of claim 9, wherein an excess of the first product in the first product chamber is transferred to the second product chamber and a portion of the second product is bled from the second product chamber to maintain a concentration of the second product within second product chamber.

15. The vapor separator of claim 14, wherein the second product in the second product chamber is at a final concentration and the final concentration is higher than a concentration of the first product in the first product chamber.

16. A mechanical vapor recompression evaporator system, comprising:
   a vapor separator having a housing comprising:
      at least one product chamber configured to receive at least one product;
      at least one vapor chamber having at least one vapor passage; and
      at least one vapor window located between the at least one product chamber and the at least one vapor chamber;
   a forced circulation heat exchanger comprising:
      an inner shell forming a generally cylindrical tube in a generally horizontal orientation;
      at least one product pass having a plurality of tubes within the inner shell configured to circulate the at least one product through the plurality of tubes;
      a vapor space formed between the inner shell and outer walls of the plurality of tubes;
      an outer shell configured to encompass a portion of the inner shell and create a first bustle and a second bustle; and
      a first fan in fluid communication with the at least one vapor passage and the first bustle; and
      a second fan in fluid communication with the first bustle and the second bustle;
   wherein the system is configured such that:
      a portion of the at least one product evaporates in the product chamber to produce a vapor that passes through the at least one window into the at least one vapor chamber, and is discharged through the at least one vapor passage; and
      the first fan is configured to receive the vapor and raise the pressure to an intermediate pressure and direct the vapor into the first bustle, and the second fan is configured to raise the pressure of the vapor from the intermediate pressure to a final pressure and discharging the vapor into the second bustle.

17. The system of claim 16, wherein the system vapor discharged into the second bustle is configured to flow into the vapor space and contact the outer walls of the plurality of tubes transferring heat from the vapor to the at least one product circulating within, and thereby forming a condensate on the outside of the plurality of tubes.

18. The system of claim 17, wherein the at least one product is hydro-fracturing wastewater having an initial TDS up to about 150,000 mg/l and the condensate produced has a TDS below about 500 mg/l.

19. The system of claim 16, wherein the vapor space and first bustle and second bustle are under a partial vacuum.

* * * * *